United States Patent
Guan et al.

(10) Patent No.: US 10,917,883 B2
(45) Date of Patent: *Feb. 9, 2021

(54) CONTROL INFORMATION SENDING METHOD, RECEIVING METHOD, AND DEVICE

(71) Applicant: Huawei Technologies Co., Ltd., Shenzhen (CN)

(72) Inventors: Lei Guan, Beijing (CN); Lixia Xue, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,926

(22) Filed: May 21, 2019

(65) Prior Publication Data

US 2019/0274124 A1  Sep. 5, 2019

Related U.S. Application Data

(63) Continuation of application No. 16/020,578, filed on Jun. 27, 2018, now Pat. No. 10,314,031, which is a
(Continued)

(30) Foreign Application Priority Data

Sep. 29, 2012  (WO) ................ PCT/CN2012/082453

(51) Int. Cl.
*H04L 12/801* (2013.01)
*H04L 12/751* (2013.01)
(Continued)

(52) U.S. Cl.
CPC ......... *H04W 72/042* (2013.01); *H04L 5/0053* (2013.01); *H04W 72/005* (2013.01);
(Continued)

(58) Field of Classification Search
CPC ............... H04W 72/042; H04W 76/27; H04W 72/0446; H04W 72/1228; H04W 72/02; H04W 72/04; H04L 5/0053
See application file for complete search history.

(56) References Cited

U.S. PATENT DOCUMENTS 9,490,951 B2   11/2016  Seo et al.
9,820,268 B2 * 11/2017  Guan .................... H04W 76/27
(Continued)

FOREIGN PATENT DOCUMENTS

CN  101123448 A  2/2008
CN  101399647 A  4/2009
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 11)," 3GPP TS 36.211, V11.0.0, pp. 1-106, 3rd Generation Partnership Project, Valbonne, France (Sep. 2012).
(Continued)

*Primary Examiner* — Faruk Hamza
*Assistant Examiner* — Abusayeed M Haque
(74) *Attorney, Agent, or Firm* — Leydig, Voit & Mayer, Ltd.

(57) ABSTRACT

A control information sending method, receiving method, and device are provided. The control information sending method includes: determining a first subframe of a first radio frame on a first carrier, where the first subframe includes a control region; sending control information in the control region of the first subframe of the first radio frame to a user equipment, where the control information includes a PDCCH; and sending an ePDCCH in a second subframe of the first radio frame to the user equipment. According to the
(Continued)

embodiments of the present invention, when control information borne on an ePDCCH cannot be sent in a first radio frame, a PDCCH can still be sent to a user equipment through a control region in a first subframe, thereby achieving purposes of performing uplink/downlink scheduling for the user equipment and downlink feedback for uplink data of the user equipment.

30 Claims, 6 Drawing Sheets

Related U.S. Application Data continuation of application No. 15/722,816, filed on Oct. 2, 2017, now Pat. No. 10,039,093, which is a continuation of application No. 14/672,050, filed on Mar. 27, 2015, now Pat. No. 9,820,268, which is a continuation of application No. PCT/CN2013/070255, filed on Jan. 9, 2013.

(51) Int. Cl.
   H04B 1/50      (2006.01)
   H04W 84/18     (2009.01)
   H04W 72/04     (2009.01)
   H04W 76/27     (2018.01)
   H04L 5/00      (2006.01)
   H04W 72/12     (2009.01)
   H04W 72/00     (2009.01)
   H04W 74/08     (2009.01)

(52) U.S. Cl.
   CPC ... H04W 72/0446 (2013.01); H04W 72/1278 (2013.01); H04W 74/0833 (2013.01); H04W 76/27 (2018.02)

(56) References Cited

U.S. PATENT DOCUMENTS

| | | | |
|---|---|---|---|
| 2008/0273479 A1* | 11/2008 | Kwak | H04L 5/0053 370/311 |
| 2009/0274109 A1 | 11/2009 | Zhang et al. | |
| 2011/0080888 A1* | 4/2011 | Lee | H04W 72/042 370/329 |
| 2012/0093118 A1* | 4/2012 | Peters | H04L 1/1607 370/329 |
| 2013/0039296 A1* | 2/2013 | Damnjanovic | H04W 72/1289 370/329 |
| 2013/0039299 A1 | 2/2013 | Papasakellariou et al. | |
| 2013/0044727 A1* | 2/2013 | Nory | H04L 5/0092 370/330 |
| 2013/0083750 A1 | 4/2013 | Nazar et al. | |
| 2013/0083769 A1 | 4/2013 | Qu et al. | |
| 2013/0201926 A1 | 8/2013 | Nam et al. | |
| 2013/0223352 A1 | 8/2013 | Sartori et al. | |
| 2013/0229957 A1 | 9/2013 | Sartori et al. | |
| 2013/0242890 A1 | 9/2013 | He et al. | |
| 2013/0250782 A1 | 9/2013 | Nimbalker et al. | |
| 2013/0265963 A1* | 10/2013 | Suzuki | H04L 27/2601 370/329 |
| 2013/0301434 A1 | 11/2013 | Krishnamurthy et al. | |
| 2013/0301542 A1 | 11/2013 | Krishnamurthy et al. | |
| 2014/0016597 A1* | 1/2014 | Zhang | H04L 5/0032 370/329 |
| 2014/0036747 A1* | 2/2014 | Nory | H04W 74/0833 370/311 |
| 2014/0092815 A1 | 4/2014 | Ye et al. | |
| 2014/0105155 A1 | 4/2014 | Kim et al. | |
| 2014/0112252 A1* | 4/2014 | Hoymann | H04W 52/0219 370/328 |
| 2014/0126487 A1 | 5/2014 | Chen et al. | |
| 2014/0192753 A1* | 7/2014 | Jang | H04L 5/0053 370/329 |
| 2014/0204843 A1 | 7/2014 | Larsson et al. | |
| 2014/0219115 A1* | 8/2014 | Etemad | H04L 47/26 370/252 |
| 2014/0233408 A1* | 8/2014 | Bontu | H04W 36/0061 370/252 |
| 2014/0247775 A1 | 9/2014 | Frenne et al. | |
| 2014/0355493 A1* | 12/2014 | Niu | H04L 12/189 370/280 |
| 2015/0092695 A1 | 4/2015 | Zhao et al. | |
| 2015/0327244 A1* | 11/2015 | Pajukoski | H04L 5/0003 370/330 |

FOREIGN PATENT DOCUMENTS

| | | |
|---|---|---|
| CN | 101478338 A | 7/2009 |
| CN | 101489184 A | 7/2009 |
| CN | 101772144 A | 7/2010 |
| CN | 102082600 A | 6/2011 |
| CN | 102378110 A | 3/2012 |
| CN | 102665230 A | 9/2012 |
| RU | 2470468 C2 | 12/2012 |
| WO | 2009041779 A1 | 4/2009 |
| WO | 2009092305 A1 | 7/2009 |
| WO | 2010041993 A1 | 4/2010 |
| WO | 2010078841 A1 | 7/2010 |
| WO | 2012103177 A1 | 8/2012 |

OTHER PUBLICATIONS

"Discussion on eREG/eCCE definition," 3GPP TSG RAN WG1 Meeting #69, Prague,Czech Republic, R1-122308, 3rd Generation Partnership Project, Valbonne, France (May 21-25, 2012).

"Design details for enhance PDCCH," 3GPP TSG RAN WG1 Meeting #66bis, Zhuhai, China, R1-113322, 3rd Generation Partnership Project, Valbonne, France (Oct. 10-14, 2011).

"Remaining details of eCCE and eREG," 3GPP TSG RAN WG1 Meeting #70, Qingdao, China, R1-123442, 3rd Generation Partnership Project, Valbonne, France (Aug. 13-17, 2012).

"Signaling and Procedure to Support Additional Special Subframe Configuration," 3GPP TSG RAN WG1 Meeting #78, Prague, Czech Republic, R1-122224, 3rd Generation Partnership Project, Valbonne, France (May 21-25, 2012).

"Intermittent transmission of enhanced downlink control channels," 3GPP TSG RAN WG1 Meeting #68bis, Jeju Island, Korea, R1-121601, 3rd Generation Partnership Project,Valbonne, France (Mar. 26-30, 2012).

"Search space of enhanced downlink control channel", 3GPP TSG RAN WG1 #68 R1-120473, 3rd Generation Partnership Project,Valbonne, France (Feb. 6-10, 2012).

Office Action corresponding in Chinese Application No. 20138000516, dated Dec. 6, 2016.

U.S. Appl. No. 16/020,578, filed Jun. 27, 2018.
U.S. Appl. No. 15/722,816, filed Oct. 2, 2017.
U.S. Appl. No. 14/672,050, filed Mar. 27, 2015.

* cited by examiner

CONTROL INFORMATION SENDING METHOD, RECEIVING METHOD, AND DEVICE

CROSS-REFERENCE TO RELATED APPLICATION

This application is a continuation of U.S. patent application Ser. No. 16/020,578, filed on Jun. 27, 2018, which is a continuation of U.S. patent application Ser. No. 15/722,816, filed on Oct. 2, 2017, now U.S. Pat. No. 10,039,093, which is a continuation of U.S. patent application Ser. No. 14/672,050, filed on Mar. 27, 2015, now U.S. Pat. No. 9,820,268, which is a continuation of International Patent Application No. PCT/CN2013/070255, filed on Jan. 9, 2013, which claims priority to International Patent Application No. PCT/CN2012/082453, filed on Sep. 29, 2012. All of the aforementioned patent applications are hereby incorporated by reference in their entireties.

TECHNICAL FIELD

Embodiments of the present invention relate to a communications technology, and in particular, to a control information sending method, receiving method, and device.

BACKGROUND

In Long Term Evolution (LTE for short) systems of releases 8, 9, and 10, each LTE carrier is backward compatible, that is, each LTE system of a later release can support access and data transmission of a user equipment of an earlier LTE release. Each subframe of a backward compatible carrier has a control region. The control region is in first n symbols of a subframe in a time domain and occupies a bandwidth of the whole carrier in a frequency domain, where n is a natural number ranging from 1 to 4. The control region bears downlink control channels such as a physical downlink control channel (PDCCH for short), a physical hybrid automatic repeat request indicator channel (PHICH for short), and a physical control format indicator channel (PCFICH for short). Demodulation of the foregoing downlink control channels is based on a cell-specific reference signal (CRS for short). The CRS is used for data demodulation, time and frequency synchronization and tracking, channel interference, radio resource management measurement, and the like, on a backward compatible carrier. When a base station has no data to be sent in a certain subframe, the base station also sends a CRS in the subframe; therefore, the energy efficiency of the base station is relatively low.

In Long Term Evolution-Advanced (LTE-A for short) systems of release 11 and a release later than release 11, a new carrier type (NCT) is introduced. A new carrier does not support access and data transmission of a user equipment (UE for short) of an earlier LTE release, and supports access and data transmission of a UE of a new release of the LTE system. It is allowed that the NCT does not have a control region on a backward compatible carrier, that is, a PDCCH is not sent, and the PDCCH is replaced by an enhanced physical downlink control channel (ePDCCH for short). Different from the PDCCH, the ePDCCH is transmitted based on channel precoding. A resource configuration of the ePDCCH is similar to that of the PDCCH, that is, assignment is implemented through an RB pair. The ePDCCH is demodulated based on a UE-specific reference signal (UERS for short).

In LTE-A systems of release 11 and a release later than release 11, the NCT does not have a control region. If an ePDCCH cannot be sent on the NCT, it is possible that the NCT cannot be used to schedule a user equipment or implement downlink feedback for uplink data of the user equipment. For example, the ePDCCH cannot be sent in a multimedia broadcast multicast service single frequency network (MBSFN for short) subframe or in special subframes in special subframe configurations 0 and 5 of a time division duplex (TDD for short) system, and uplink or downlink scheduling of the user equipment cannot be implemented. Specifically, if a multicast or broadcast service is transmitted in an MBSFN subframe, all resource block pairs (RB pair) of the current carrier are used for multicast or broadcast, that is, no RB pair is assigned to the ePDCCH; for special subframes in TDD special subframe configurations 0 and 5, a downlink timeslot part has only three symbols, and resources are few, so an ePDCCH cannot be sent.

SUMMARY

Embodiments of the present invention provide a control information sending method, receiving method, and device, which are used to overcome the disadvantage that a user equipment cannot be scheduled and downlink feedback for uplink data of the user equipment cannot be implemented when an ePDCCH cannot be sent.

According to a first aspect, an embodiment of the present invention provides a control information sending method, which includes:

determining, by a network device, a first subframe of a first radio frame on a first carrier, where the first subframe includes a control region, the control region is in first n symbols of the first subframe, and n is a natural number less than 5;

sending, by the network device, control information in the control region of the first subframe of the first radio frame to a user equipment, and sending a demodulation reference signal in the first subframe of the first radio frame to the user equipment, where the control information at least includes a PDCCH; and sending, by the network device, an ePDCCH in a second subframe of the first radio frame to the user equipment.

With reference to the first aspect, in a first possible implementation manner, in the sending a demodulation reference signal in the first subframe to the user equipment, the demodulation reference signal is sent only when the control information is sent; and/or, the demodulation reference signal is only used to demodulate the control information.

With reference to the first aspect or the first possible implementation of the first aspect, in a second possible implementation manner, before the determining a first subframe of a first radio frame on a first carrier, the method further includes: sending RRC dedicated signaling to the user equipment, so as to indicate a position of the first subframe of the first radio frame on the first carrier to the user equipment.

With reference to the second possible implementation of the first aspect, in a third possible implementation manner, before the sending RRC dedicated signaling the user equipment, sending, by the network device, system information to the user equipment, where the system information is scheduled by an ePDCCH scrambled by a system information radio network temporary identifier SI-RNTI;

receiving, by the network device, random access information sent by the user equipment, where configuration information of the random access information is obtained from the system information;

sending, by the network device, random access response information to the user equipment, where the random access response information is scheduled by an ePDCCH scrambled by a random access radio network temporary identifier RA-RNTI; and sending RRC connection setup information to the user equipment.

According to a second aspect, the present invention further provides a control information receiving method, which includes:

determining, by a user equipment, a first subframe of a first radio frame on a first carrier, where the first subframe includes a control region, the control region is in first n symbols of the first subframe, and n is a natural number less than 5;

receiving, by the user equipment, control information, sent by a network device, in the control region of the first subframe of the first radio frame, and receiving a demodulation reference signal, sent by the network device, in the first subframe, where the control information at least includes a PDCCH; and receiving, by the user equipment, an ePDCCH, sent by the network device, in a second subframe of the first radio frame.

With reference to the second aspect, in a first possible implementation manner, in the receiving a demodulation reference signal, sent by the network device, in the first subframe, the demodulation reference signal is sent only when the control information is sent; and/or, the demodulation reference signal is only used to demodulate the control information.

With reference to the second aspect or the first possible implementation of the second aspect, in a second possible implementation manner, before the determining a first subframe of a first radio frame on a first carrier, receiving RRC dedicated signaling sent by the network device, where the RRC dedicated signaling is used to indicate a position of the first subframe of the first radio frame on the first carrier.

With reference to the second possible implementation of the second aspect, in a third possible implementation manner, before the receiving RRC dedicated signaling sent by the network device, receiving, by the user equipment, system information sent by the network device, where the system information is scheduled by an ePDCCH scrambled by a system information radio network temporary identifier SI-RNTI;

sending, by the user equipment, random access information to the network device, where configuration information of the random access information is obtained from the system information;

receiving, by the user equipment, random access response information sent by the network device, where the random access response information is scheduled by an ePDCCH scrambled by a random access radio network temporary identifier RA-RNTI; and receiving, by the user equipment, RRC connection setup information sent by the network device.

According to a third aspect, the present invention further provides a network device, which includes:

a determining module, configured to determine a first subframe of a first radio frame on a first carrier, and transmit a position of the determined first subframe to a sending module, where the first subframe includes a control region, the control region is in first n symbols of the first subframe, and n is a natural number less than 5; and the sending module, configured to send control information in the control region of the first subframe of the first radio frame to a user equipment, and send a demodulation reference signal in the first subframe of the first radio frame to the user equipment, where the control information at least includes a PDCCH, where the sending module is further configured to send an ePDCCH in a second subframe of the first radio frame to the user equipment.

With reference to the third aspect, in a first possible implementation manner, in the sending a demodulation reference signal in the first subframe to the user equipment, the demodulation reference signal is sent only when the control information is sent; and/or, the demodulation reference signal is only used to demodulate the control information.

With reference to the third aspect, or in the first possible implementation of the third aspect, in a second possible implementation manner, the sending module is further configured to send RRC dedicated signaling to the user equipment, so as to indicate a position of the first subframe of the first radio frame on the first carrier to the user equipment.

With reference to the second possible implementation of the third aspect, in a third possible implementation manner, the network device further includes:

an RRC connection module, configured to: before the radio resource control RRC dedicated signaling is sent to the user equipment, send system information to the user equipment, where the system information is scheduled by an ePDCCH scrambled by a system information radio network temporary identifier SI-RNTI; receive random access information sent by the user equipment, where configuration information of the random access information is obtained from the system information; send random access response information to the user equipment, where the random access response information is scheduled by an ePDCCH scrambled by a random access radio network temporary identifier RA-RNTI; and send RRC connection setup information to the user equipment.

According to a fourth aspect, the present invention further provides a control information receiving apparatus, which includes:

a determining module, configured to determine a first subframe of a first radio frame on a first carrier, where the first subframe includes a control region, the control region is in first n symbols of the first subframe, and n is a natural number less than 5; and a receiving module, configured to receive control information, sent by a network device, in the control region of the first subframe of the first radio frame that is determined by the determining module, and receive a demodulation reference signal, sent by the network device, in the first subframe, where the control information at least includes a PDCCH, where the receiving module is further configured to receive an ePDCCH, sent by the network device, in a second subframe of the first radio frame.

With reference to the fourth aspect, in a first possible implementation manner, in the receiving a demodulation reference signal, sent by the network device, in the first subframe, the demodulation reference signal is sent only when the control information is sent; and/or, the demodulation reference signal is only used to demodulate the control information.

With reference to the fourth aspect, or the first possible implementation of the fourth aspect, in a second possible implementation manner, the receiving module is further configured to: before the first subframe of the first radio frame on the first carrier is determined, receive RRC dedicated signaling sent by the network device, where the RRC dedicated signaling is used to indicate a position of the first subframe of the first radio frame on the first carrier.

With reference to the second possible implementation of the fourth aspect, in a third possible implementation manner, the apparatus further includes: an RRC connection module, configured to: before RRC dedicated signaling sent by the network device is received, receive system information sent by the network device, where the system information is scheduled by an ePDCCH scrambled by a system information radio network temporary identifier SI-RNTI; send random access information to the network device, where configuration information of the random access information is obtained from the system information; receive random access response information sent by the network device, where the random access response information is scheduled by an ePDCCH scrambled by a random access radio network temporary identifier RA-RNTI; and receive RRC connection setup information sent by the network device.

In the technical solutions provided in the embodiments of the present invention, a first radio frame on a first carrier includes a first subframe where a control region is set, and a network device can send control information borne on a PDCCH to a user equipment through the first subframe of the radio frame. Therefore, when control information borne on an ePDCCH cannot be sent in the radio frame, the PDCCH can still be sent to the user equipment through the control region in the first subframe, thereby achieving purposes of performing uplink/downlink scheduling for the user equipment and downlink feedback for uplink data of the user equipment.

DESCRIPTION OF EMBODIMENTS

The following first describes the concept of a subframe in an LTE system and channels involved in embodiments of the present invention. In an LTE system, one radio frame includes 10 subframes in a time domain, and one carrier includes multiple resource block pairs (RB pair for short) in a frequency domain. A base station performs scheduling in units of RB pairs. One RB pair occupies one subframe in terms of time and occupies 12 orthogonal frequency division multiplexing (OFDM for short) subcarriers in terms of frequency. In the case of a normal cyclic prefix, one subframe includes 14 OFDM symbols; in the case of an extended cyclic prefix, one subframe includes 12 OFDM symbols. A PHICH is downlink acknowledgement/non-acknowledgement information fed back to an uplink PUSCH, and a PCFICH is used to dynamically indicate the number of symbols occupied by the control region in a current subframe. Data scheduling on a backward compatible carrier is completed by a PDCCH. The PDCCH is generally sent by using a space-frequency transmit diversity mechanism. The PDCCH includes DL_assignment for scheduling downlink data PDSCH and UL_grant for scheduling uplink data PUSCH.

Figure 1:
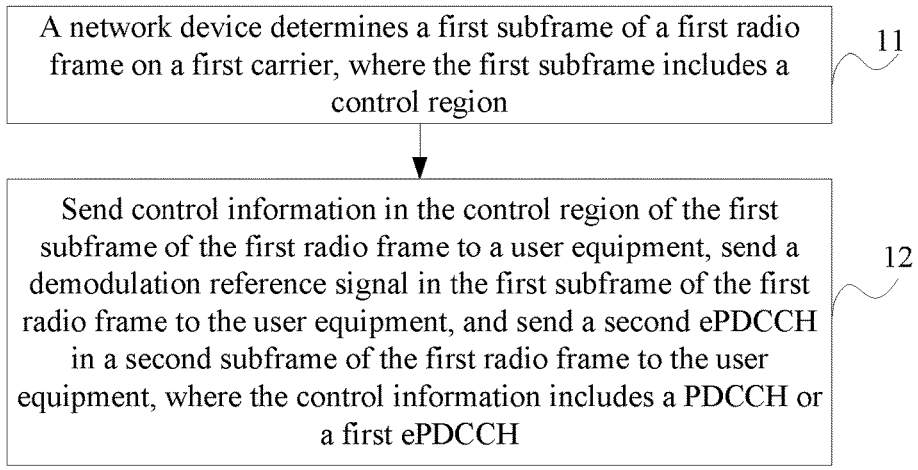
FIG. 1 is a flowchart of a control information sending method according to an embodiment of the present invention.

FIG. 1 is a flowchart of a control information sending method according to an embodiment of the present invention. In this embodiment, the executing entity is a network device, for example, it may be an access network device, such as a base station. As shown in FIG. 1B, the method provided in this embodiment includes:

Step 11: The network device determines a first subframe of a first radio frame on a first carrier, where the first subframe includes a control region.

The first carrier defined in the embodiment of the present invention may be a carrier defined in an LTE system later than release 11. The carrier defined in an LTE system later than release 11 can be called a backward compatible carrier. For example, the first carrier does not support access of a UE of an LTE system earlier than release 11. Specifically, a synchronization signal on the first carrier may be modified, so that the synchronization signal is different from that of the backward compatible carrier, and a UE of an earlier LTE release cannot be accessed. The UE of an earlier LTE release may also be prevented, by using another method, from accessing the carrier. For another example, a CRS is sent only in a part of subframes and/or a part of bandwidths on the first carrier. However, a CRS needs to be sent in each subframe on a backward compatible carrier, and even though there is no information to be sent, a CRS must also be sent for the UE to perform an operation such as measurement. For another example, the first carrier supports a configuration of an ePDCCH public search space, while a public search space of a backward compatible carrier is located in a public search space of a PDCCH in the control region. Definitely, any other difference between the first carrier and the backward compatible carrier is not excluded.

On the first carrier, there may be one radio frame that includes a first subframe where a control region is set, and there may also be multiple radio frames that include first subframes. The control region is in first n symbols of the first subframe, where n is a natural number less than 5. The control region may be a control region for time division multiplexing of data.

Figure 2:
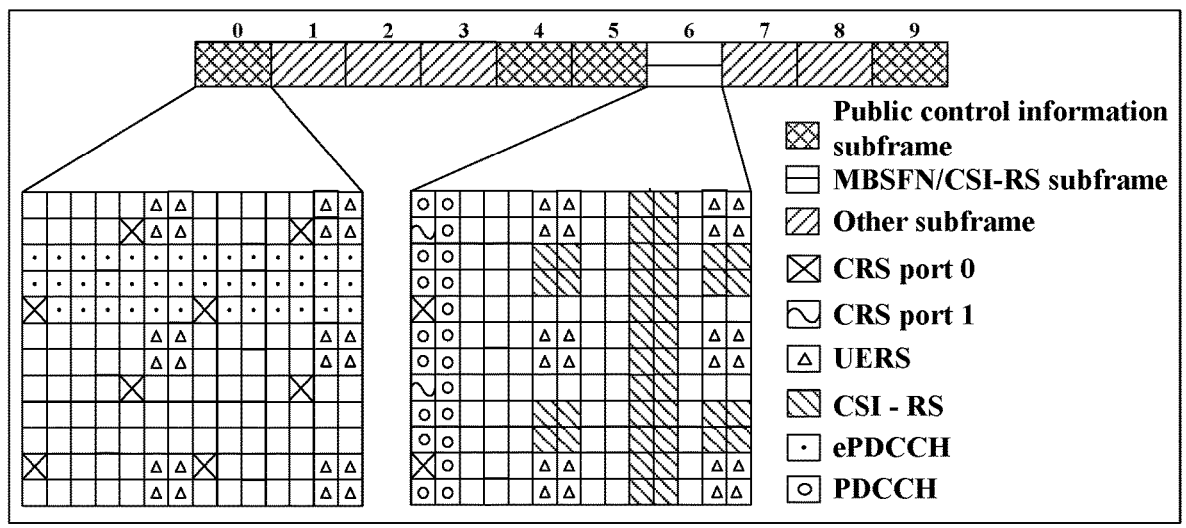
FIG. 2 is a schematic diagram of a first radio frame on a first carrier according to an embodiment of the present invention.

In the radio frame that includes the first subframe, any other subframe except the first subframe is called a second subframe. No control region is set in a second subframe of the first radio frame. The second subframe may be used to send an ePDCCH. In the following, a radio frame that includes the first subframe and the second subframe is called a first radio frame. The first radio frame may include one or more first subframes. Using FIG. 2 as an example, subframe 6 is configured with a control region where the number of symbols is 2, and subframe 6 is a first subframe; subframe 0 has no control region, scheduling for a user equipment depends on the ePDCCH, and subframe 0 is a second subframe.

Step 12: Send control information in the control region of the first subframe of the first radio frame to a user equipment, send a demodulation reference signal in the first subframe of the first radio frame to the user equipment, and send an ePDCCH in the second subframe of the first radio frame to the user equipment, where the control information includes a PDCCH or a first ePDCCH.

The network device may send a second ePDCCH in the second subframe of the first radio frame to the user equipment.

When the network device sends the control information in the control region of the first subframe to the user equipment, the network device sends the demodulation reference signal in the first subframe to the user equipment. Optionally, the demodulation reference signal is sent only when the control information is sent, or the demodulation reference signal is used for demodulation of the control information in the control region, but is not used for other operations such as measurement or synchronization. Therefore, the demodulation reference signal is not sent when the control information is not sent, so that the network device can save energy, and interference on a neighboring cell can be reduced. Specifically, the UE performs accurate synchronization and/or radio resource management measurement (including measurement on reference signal receiving power, reference signal receiving quality, and the like) by using a CRS that is periodically sent on the first carrier, for example, a CRS with a cycle of 5 ms (such as CRSs in subframe 0 and subframe 5). However, assuming that the foregoing demodulation reference signal in the first subframe can use a resource position of the CRS, the demodulation reference signal in the first subframe is only used for demodulation, for example, is only used for demodulation of the control information in the control region, and is not used for the accurate synchronization and/or radio resource management measurement.

Optionally, if the network device sends the control information in the control region of the first subframe to the user equipment, the network device also sends the demodulation reference signal in the first subframe to the user equipment; and if the network device does not send the control information in the control region of the first subframe, the network device does not send the demodulation reference signal in the first subframe. This is because the demodulation reference signal is only used for demodulation of the control information in the control region, and is not used for other operations such as measurement or synchronization. Therefore, the demodulation reference signal is not sent when the control information is not sent, so that the network device can save energy, and interference on a neighboring cell can be reduced.

Optionally, the network device may send the demodulation reference signal in the control region in the first subframe of the first radio frame to the user equipment. Optionally, a time-frequency position and/or a sequence of the demodulation reference signal is the same as that of a cell-specific reference signal CRS defined in an LTE system earlier than release 11.

Optionally, an antenna port corresponding to the demodulation reference signal is all or a part of antenna ports 7 to 10 in the LTE system, where the antenna ports 7 to 10 are antenna ports corresponding to a user equipment-specific reference signal.

The network device may further send the ePDCCH in the second subframe of the first radio frame to the user equipment. The control information at least includes a PDCCH. Therefore, the first radio frame may be used to send the PDCCH and may also be used to send the ePDCCH.

Figure 10:
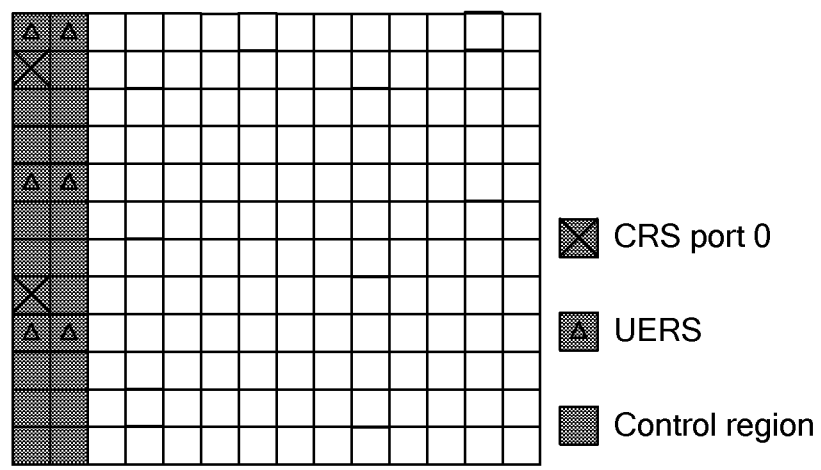
FIG. 10 is a schematic diagram of a first subframe on a first carrier according to an embodiment of the present invention.

The PDCCH in the control region uses non-precoding transmission and is transmitted by using a single antenna port or a transmit diversity mechanism. The time-frequency position and/or the sequence of the demodulation reference signal used to demodulate the PDCCH may be the same as that of a cell-specific reference signal CRS defined in the LTE system earlier than release 11; or, the PDCCH may be demodulated depending on a UERS, where the UERS is all or a part of configuration information of a user equipment-specific reference signal UERS of antenna ports 7 to 10 in an LTE system of release 11. As shown in FIG. 10, using a 2-symbol control region as an example, the region includes a half of UERS time and frequency resources of an LTE system of the original release Rel-11, that is, a UERS that occupies two symbols, and the antenna port may also be half of the ports 7 to 10, for example, only antenna ports 7 and 8 or antenna ports 7 and 9 are supported, and certainly, all of ports 7 to 10 may also be supported. Alternatively, the PDCCH may also use a precoding transmission mode similar to that of the ePDCCH; in this case, the demodulation reference signal such as CRS or UERS is precoded together with the PDCCH, and for the CRS, all or a part of CRS ports 0 to 3 may be used. The PDCCH may be uplink schedule grant (Uplink_grant, UL_grant for short) and may also be downlink schedule assignment (Downlink_assignment, DL_assignment for short). Further, the control information further includes a PHICH and/or a PCFICH. The UE receives the PDCCH in the first subframe. If the first subframe further includes a PHICH and a PCFICH, the UE may further receive the PHICH and the PCFICH. The UE receives only the ePDCCH in the second subframe.

The first enhanced physical downlink control channel ePDCCH may also be sent in the control region. Generally, the first ePDCCH is transmitted in precoding mode and based on the UERS. Alternatively, the first ePDCCH may also be transmitted based on the CRS, and in this case, the CRS needs to be precoded together with the first ePDCCH. Alternatively, the first ePDCCH may also be transmitted by using a non-precoding single antenna port or transmit diversity similar to that of the PDCCH, and in this case, the demodulation reference signal may be a CRS or a UERS.

In addition, in a current LTE system, a subcarrier shift may be implemented for a frequency domain position of a CRS in a PRB according to a cell identifier, for example, a single-port CRS corresponding to cell identifier 0 is on subcarrier 0 and subcarrier 6 in a certain symbol of one PRB, a single-port CRS corresponding to cell identifier 1 is on subcarrier 1 and subcarrier 7 in a certain symbol of one PRB, and so on. Subcarrier positions of a UERS in a certain symbol of one PRB are fixed, for example, a UERS of ports 7 and 8 occupies subcarriers 0, 5, and 10. Therefore, if the CRS and the UERS in the control region coincide, conflict may occur. One solution is to disable cell-identifier-based frequency-domain subcarrier shift of the CRS, and predefine subcarrier positions that do not conflict with the UERS, for example, subcarrier 2 and subcarrier 8. Another solution is to enable cell-identifier-based subcarrier shift of the UERS and the CRS. For example, the CRS occupies subcarriers 0 and 6, and correspondingly, the UERS changes to subcarriers 1, 6, and 11.

Further, the second ePDCCH may be an ePDCCH introduced in the LTE system of release 11. The second ePDCCH is assigned in units of PRB pairs and may be transmitted in precoding mode and based on UE-specific reference signals. The transmission mode of the first ePDCCH may be the same as that of the second ePDCCH, that is, both are based on UE-specific reference signals and may be based on precoding transmission. However, a resource of the first ePDCCH can occupy only a resource in the above control region.

Optionally, before determining the first subframe of the first radio frame on the first carrier, the network device may further send radio resource control (RRC for short) dedicated signaling to the user equipment, so as to indicate a position of the first subframe of the first radio frame on the first carrier to the user equipment. Besides, the position of the first subframe of the first radio frame may be preset in the network device and the user equipment separately. Specifically, one indication manner is: when the network device indicates which subframe of the first radio frame is the first subframe, where the first radio frame is any radio frame, a bitmap manner may be used as the specific indication manner. For example, if the first radio frame has 10 subframes, 10 bits are used to indicate the first subframes separately. This manner is also applicable when the number of subframes of the first radio frame differs. For example, if there are eight subframes, eight bits are used for indication. Another indication manner is: the network device may indicate a cycle of the first subframe and a position of the first subframe in the cycle. For example, if the cycle is two radio frames, that is, 20 subframes, and positions of the first subframe in this cycle are subframes 0 and 1 of radio frame 0, the positions are subframes 0 and 1 of radio frames 2, 4, 6, and so on, in a next cycle. This manner is more flexible than the first manner, and better matching with PMCH subframes can be implemented because a PMCH has the largest demand for the first subframe.

Optionally, before the network device sends the first ePDCCH in the control region of the first subframe of the first radio frame to the user equipment, the method according to this embodiment may further include:

determining a resource block RB group of the first ePDCCH in the control region, where the RB group corresponds to one RB pair, and the RB pair is a resource assignment unit of a physical downlink shared channel PDSCH in the LTE system;

determining a first candidate resource of the first ePDCCH in the RB group, where the first candidate resource includes a part of or all of resources of each RB of at least two RBs, and the at least two RBs belong to the RB group; and precoding the first ePDCCH and the demodulation reference signal in the at least two RBs or in the RB group to which the first candidate resource belongs.

Optionally, an antenna port corresponding to the first ePDCCH is determined; and for the first ePDCCH and the demodulation reference signal that are corresponding to a same antenna port, the first ePDCCH and the demodulation reference signal that are corresponding to the same antenna port are precoded by using a same precoding vector or precoding matrix. Specifically, the antenna port corresponding to the first ePDCCH may be determined according to the first candidate resource. Specifically, the antenna port may be determined according to a resource position of the first candidate resource, for example, a position of a part of resources in one RB corresponds to antenna port 7, and a position of another part of resources corresponds to antenna port 8; the antenna port may also be determined according to a resource unit number or a resource position of the first ePDCCH, where the resource unit is at least one of an RB pair, an RB, an ECCE, an eREG, and an RE that form the first ePDCCH; and the antenna port may also be configured through RRC dedicated signaling, and specially, a port may be randomly selected, and then configured for the UE through the RRC signaling.

Optionally, the RB group corresponds to one RB pair, where the RB pair is a resource assignment unit of the second ePDCCH, and the RB pair is also a resource assignment unit of a PDSCH resource in the LTE. Specifically, the size of the resource in the RB group may be understood as comparable to the size of the resource in an RB pair, that is, their sizes are approximately equal. The RB group may also be called a PRB binding group because PRB binding can be implemented in this group to improve channel estimation performance.

Optionally, the RB group may correspond to an RB pair for resource assignment of the second ePDCCH in an extended cyclic prefix scenario. For example, four RBs may be included, where every two RBs correspond to one enhanced control channel element (ECCE), and one ECCE corresponds to one antenna port, that is, there are two antenna ports in total, such as ports 7 and 8.

Figure 11A:
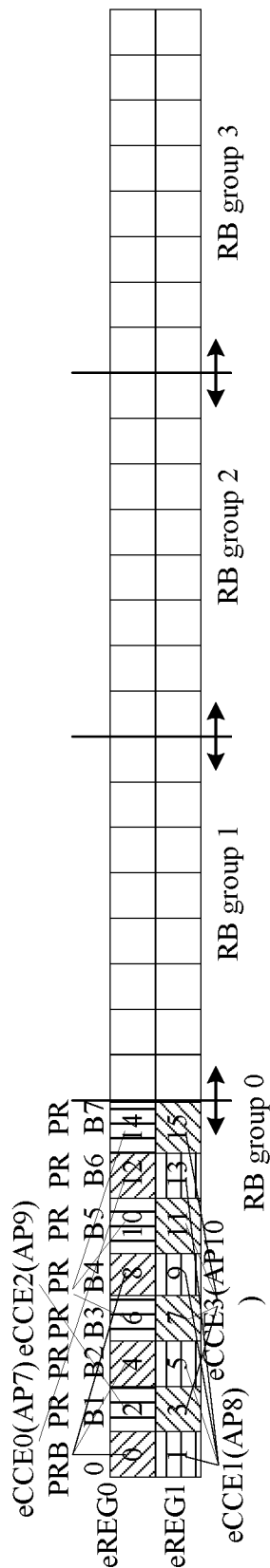
FIG. 11(a) and FIG. 11(b) are schematic diagrams of a control region according to an embodiment of the present invention.

As shown in FIG. 11(a), how to configure one resource set of the first ePDCCH is used as an example. In a case where the number of resource sets is greater than 1, operations on each resource set are similar. The resource set includes four PRB binding groups, each PRB binding group includes eight PRBs, and each PRB includes two enhanced resource element groups (eREG,). In other words, one PRB binding group includes 16 eREGs. It is assumed that four eREGs form one enhanced control channel element (ECCE), and one first ePDCCH may have different aggregation levels, where the aggregation levels are determined according to the number of ECCEs, for example, one first ePDCCH may have four aggregation levels: 1, 2, 4, and 8, which means that one first ePDCCH may be formed by 1, 2, 4, or 8 ECCEs. Definitely, similar processing is performed for any other aggregation level. The first ePDCCH also involves a concept of a search space. For first ePDCCHs of different aggregation levels, search spaces corresponding to the aggregation levels may exist, that is, resource spaces for detecting the first ePDCCHs. In a search space, there are multiple candidate resources of the first ePDCCH, that is, candidate positions. In other words, the first ePDCCH is sent in one or more positions of the multiple candidate resources, and correspondingly, the UE detects the first ePDCCH only on these candidate resources in the search space. Using aggregation level 1 as an example, it is assumed that there are four candidate resources, and each candidate resource is formed by one ECCE, that is, four eREGs. As shown in FIG. 11(a), eREGs 0, 4, 8, and 12 form ECCE 0, eREGs 1, 5, 9, and 13 form ECCE 1, eREGs 2, 6, 10, and 14 form ECCE 2, and eREGs 3, 7, 11, and 15 form ECCE 3. Definitely, candidate resources of aggregation level 2 may be ECCEs 0 and 1, ECCEs 2 and 3, and so on. A UERS antenna port used by the first ePDCCH may correspond to the ECCE or eREGs occupied by the first ePDCCH. Using the ECCE as an example, ECCE 0 may correspond to port 7, ECCE 1 may correspond to port 8, ECCE 2 may correspond to port 9, and ECCE 3 may correspond to port 10; and definitely, any other similar example is not excluded. Besides, the first ePDCCH and the UERS corresponding to the port need to be precoded, that is, multiplied by a precoding vector or matrix. The candidate resource, ECCE 0, of aggregation level 1 is still used as an example. Specifically, in the at least two PRBs included in the candidate resource, that is, PRBs 0, 2, 4, and 6, or in a PRB binding group to which the first candidate resource belongs, that is, PRBs 0 to 7, the first ePDCCH and UERS to be sent on the candidate resource may be precoded for a same antenna port, that is, antenna port 7 corresponding to ECCE 0. To enhance detection performance for the first ePDCCH, the first ePDCCH and the UERS may be precoded by using a same precoding vector or precoding matrix. In this way, when the UE receives the first ePDCCH, PRBs 0, 2, 4, and 6 occupied by the candidate resource, or the UERSs in PRBs 0 to 7 in the PRB binding group to which the candidate resource belongs can be used for joint channel estimation, that is, interpolation can be performed, which improves correctness of channel estimation and further improves the detection performance for the first ePDCCH. The above candidate resource is the first candidate resource, and the first ePDCCH transmitted on the first candidate resource may be a centralized ePDCCH and may also be a distributed ePDCCH. In the above example, the centralized ePDCCH is used, that is, a single antenna port is used for precoding. For the distributed ePDCCH, one candidate resource may also be mapped to multiple PRBs, and two antenna ports, such as ports 7 and 9 or ports 7 and 8, may be used alternately to perform random precoding, so as to obtain a diversity gain.

Optionally, before the network device sends the first ePDCCH in the control region of the first subframe of the first radio frame to the user equipment, the method according to this embodiment may further include:

determining a resource set of the first ePDCCH in the control region, where the resource set includes multiple resource block RB groups, each RB group of the multiple RB groups corresponds to one RB pair, and the RB pair is a resource assignment unit of a physical downlink shared channel PDSCH in the LTE system;

determining a second candidate resource of the first ePDCCH in the resource set, where the second candidate resource includes a part of or all of resources of each RB group of at least two RB groups, and the at least two RB groups are RB groups of the multiple RB groups; and precoding the demodulation reference signal and the first ePDCCH that are borne in the at least two RB groups included in the second candidate resource.

Further, the network device sends the precoded demodulation reference signal and first ePDCCH in the control region of the first subframe of the first radio frame to the user equipment.

Optionally, an antenna port corresponding to the first ePDCCH is determined; and in each RB group included in the second candidate resource, for the first ePDCCH and the demodulation reference signal that are corresponding to a same antenna port, the first ePDCCH and the demodulation reference signal that are corresponding to the same antenna port are precoded by using a same precoding vector or precoding matrix. Specifically, the antenna port corresponding to the first ePDCCH may be determined according to the second candidate resource. Specifically, the antenna port may be determined according to a resource position of the second candidate resource, for example, a position of a part of resources in one RB corresponds to antenna port 7, and a position of another part of resources corresponds to antenna port 8; the antenna port may also be determined according to a resource unit number or a resource position of the first ePDCCH, where the resource unit is at least one of an RB pair, an RB, an ECCE, an eREG, and an RE that form the first ePDCCH; and the antenna port may also be configured through RRC dedicated signaling, and specially, a port may be randomly selected, and then configured for the UE through the RRC signaling.

Optionally, the RB group corresponds to one RB pair, where the RB pair is a resource assignment unit of the second ePDCCH, and the RB pair is also a resource assignment unit of a PDSCH resource in the LTE. Specifically, the size of the resource in the RB group may be understood as comparable to the size of the resource in an RB pair, that is, their sizes are approximately equal. The RB group may also be called a PRB binding group because PRB binding can be implemented in this group to improve channel estimation performance.

Optionally, the RB group may correspond to an RB pair for resource assignment of the second ePDCCH in an extended cyclic prefix scenario. For example, four RBs may be included, where every two RBs correspond to one enhanced control channel element (ECCE), and one ECCE corresponds to one antenna port, that is, there are two antenna ports in total, such as ports 7 and 8.

Figure 11B:
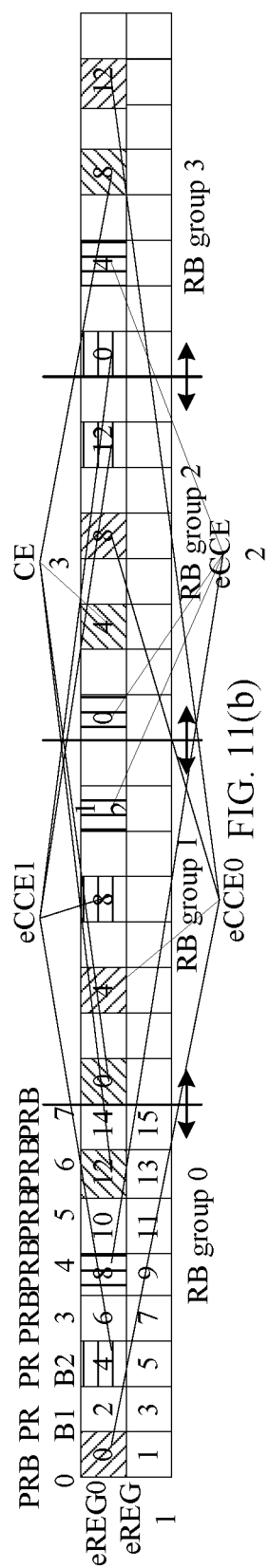

As shown in FIG. 11(b), how to configure one resource set of the first ePDCCH is used as an example. In a case where the number of resource sets is greater than 1, operations on each resource set are similar. The resource set includes four PRB binding groups, each PRB binding group includes eight PRBs, and each PRB includes two eREGs. In other words, one PRB binding group includes 16 eREGs. It is assumed that four eREGs form one ECCE. These basic parameters are the same as those in the foregoing embodiment, and the definition of the search space is also the same. Still using aggregation level 1 as an example, it is assumed that there are four candidate resources, and each candidate resource is formed by one ECCE, that is, four eREGs. As shown in FIG. 11(b), only the four eREGs are mapped to different PRB binding groups. For example, eREG 0 in PRB binding group 0, eREG 4 in PRB binding group 1, eREG 8 in PRB binding group 2, and eREG 12 in PRB binding group 3 form ECCE 0, and others are as shown in FIG. 11(b). Definitely, candidate resources of aggregation level 2 may be ECCEs 0 and 1, or ECCEs 2 and 3, or the like. In this way, a greater frequency diversity gain can be obtained through mapping. The UERS antenna port used by the first ePDCCH may correspond to the ECCE, or eREG, or resource element (RE) occupied by the first ePDCCH. For example, in a granularity of REs, different REs in eCCE 0 may alternately correspond to port 7 and port 9, or port 7 and port 8, or the like. Definitely, any other similar example is not excluded. Besides, the first ePDCCH and the UERS corresponding to the port need to be precoded, that is, multiplied by a precoding vector or matrix. Specifically, the candidate resources eCCEs 0 and 1 of aggregation level 2 are still used as an example: the occupied resources are PRBs 0 and 2 in PRB binding group 0, PRBs 2 and 4 in PRB binding group 1, PRBs 4 and 6 in PRB binding group 0, and PRBs 0 and 6 in PRB binding group 0. Then, the first ePDCCH and the UERS to be sent on the candidate resources are precoded for a same antenna port, such as port 7. To enhance detection performance for the first ePDCCH, the first ePDCCH and the UERS may be precoded by using a same precoding vector or precoding matrix. For example, the same precoding vector or matrix is used in the PRBs, occupied by the candidate resource, in each PRB binding group, such as PRBs 0 and 2 in PRB binding group 0, or in PRBs in another binding group; or, the same precoding vector or matrix is used in all PRBs in each PRB binding group. In this way, when the UE receives the first ePDCCH, PRBs 0 and 2, occupied by the candidate resource, in the PRB binding group, or the UERSs in PRBs 0 to 7 in PRB binding group 0 to which the candidate resource belongs, can be used for joint channel estimation, that is, interpolation can be performed, which improves correctness of channel estimation and further improves the detection performance for the first ePDCCH. The candidate resource is the second candidate resource, and the first ePDCCH transmitted on the second candidate resource is a distributed ePDCCH. For the distributed ePDCCH, one candidate resource may be mapped to multiple PRB binding groups, and two antenna ports, such as ports 7 and 9 or ports 7 and 8, may be alternately used to perform random precoding, so as to obtain a frequency domain diversity gain and an antenna diversity gain.

Optionally, before the network device sends the first ePDCCH in the control region of the first subframe of the first radio frame to the user equipment, the method according to this embodiment may further include:

determining, a third candidate resource bearing the first ePDCCH in the control region, where the third candidate resource includes resources in at least two resource block RBs; and determining an antenna port corresponding to the first ePDCCH borne on the third candidate resource.

Specifically, the corresponding antenna port may be determined according to a position of the third candidate resource; an antenna port may also be randomly selected from a preconfigured antenna port set, for example, the antenna port set includes ports 7 and 8, and the network device may select port 8 and then notifies the UE that the port 8 is selected; the antenna port may also be determined according to a resource unit number or a resource position of the first ePDCCH, where the resource unit is at least one of an RB pair, an RB, an ECCE, an eREG, and an RE that form the first ePDCCH; and the antenna port may also be configured through RRC dedicated signaling, and specifically, a port may be randomly selected, and then configured for the UE through the RRC signaling.

If any proper subset of the third candidate resource not capable of transmitting any complete ePDCCH, or if any two proper subsets of the third candidate resource are not capable of transmitting any two complete ePDCCHs separately by using a same antenna port, in the resources in the at least two RBs, for the first ePDCCH and the demodulation reference signal that are corresponding to a same antenna port, the first ePDCCH and the demodulation reference signal that are corresponding to the same antenna port are precoded by using a same precoding vector or precoding matrix.

Further, the network device sends the precoded demodulation reference signal and first ePDCCH in the control region of the first subframe of the first radio frame to the user equipment.

Optionally, before the network device sends control information to the user equipment, the above method may further include:

indicating an antenna port mode to the UE, where the antenna port mode is a single-antenna-port mode in units of enhanced control channel element (eCCEs), or a two-antenna-port mode in units of resource element REs.

Specifically, because the number of time domain symbols occupied by the control region is small, the number of frequency domain RBs occupied by one ePDCCH candidate resource is greater than the number of frequency domain RBs occupied by the second ePDCCH. As a result, the centralized second ePDCCH occupies resources in one RB pair in priority. Therefore, the first ePDCCH in the control region can obtain enough frequency domain diversity gains, and centralized and distributed ePDCCHs can be distinguished merely by antenna port utilization manners, not by resource mapping manners. For example, one type of the first ePDCCH is transmitted through a single antenna port of a centralized second ePDCCH and based on channel information precoding, and another type of the first ePDCCH is transmitted through dual antenna ports of a distributed second ePDCCH alternately and based on random precoding. That an antenna port corresponding to the first ePDCCH is determined includes: determining the antenna port corresponding to the first ePDCCH corresponding to the antenna port mode. Specifically, the antenna port corresponding to the first ePDCCH is an antenna port used to transmit the first ePDCCH, so the antenna port corresponding to the first ePDCCH corresponding to the antenna port mode may be understood as an antenna port used to transmit the first ePDCCH and corresponding to the above single-antenna-port mode or dual antenna port mode.

Figure 12A:
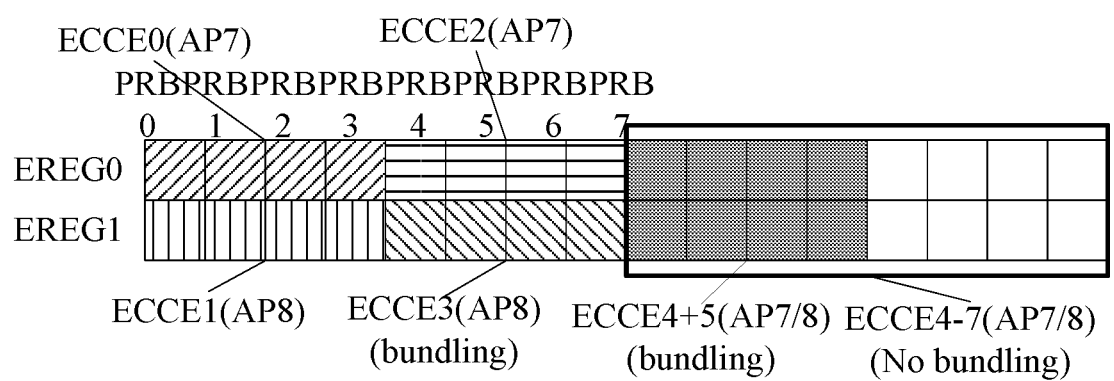
FIG. 12(a) and FIG. 12(b) are schematic diagrams of another control region according to an embodiment of the present invention.
Figure 12B:
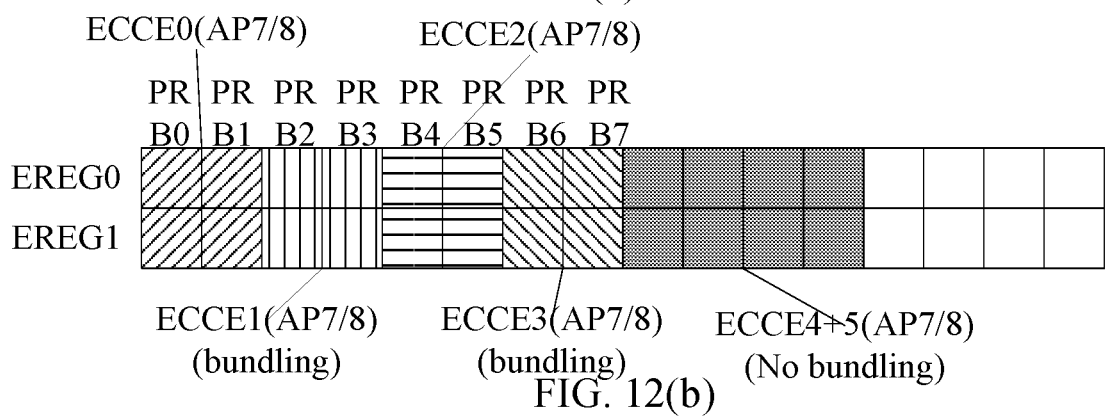

Specifically, as shown in FIG. 12, it is assumed that one resource set of the first ePDCCH is configured, the set includes 16 PRBs in the control region, each PRB includes two eREGs, and one eCCE includes four eREGs. Certainly, processing is similar in a case where another number of resource sets are configured, one set includes another number of PRBs, one PRB includes another number of eREGs, or one eCCE includes another number of eREGs, which is not limited herein. Using aggregation level 1 as an example, as shown in FIG. 12(a), a third candidate resource is eCCE 0, eCCE 1, eCCE 2, or eCCE 3, and corresponding antenna ports are ports 7, 8, 9, and 10, separately; for aggregation level 2, an example in which third candidate resources are eCCEs 4 and 5 is used, and corresponding antenna port is port 7 or 8, which may specifically be configured by using high layer signaling or determined by using a UE identifier; for aggregation level 4, an example in which third candidate resources are eCCEs 4, 5, 6, and 7 is used, and a specific antenna port may be predefined and may also be configured by using high layer signaling or determined by using a UE identifier. The first ePDCCH borne on the third candidate resource is a centralized ePDCCH. An example in FIG. 12(b) is similar. It can be seen that a centralized first ePDCCH, especially that of a low aggregation level, such as aggregation level 1, may occupy resources in multiple PRBs, so that frequency diversity and frequency selective gains can be increased.

Besides, if a part of the third candidate resources cannot be used to transmit another first ePDCCH, using a third candidate resource of aggregation level 1 in FIG. 12(a) or FIG. 12(b), eCCE 0 as an example, it can be seen that a part of resources where eCCE 0 is located cannot be used as another third candidate resource, then, in the at least two PRBs included in the third candidate resource, such as PRBs 0 to 3 included in eCCE 0 shown in FIG. 12(a) or PRBs 0 and 1 in eCCE 0 shown in FIG. 12(b), the first ePDCCH may be precoded by using a same precoding vector or precoding matrix, for a same antenna port, such as antenna port 7 used to transmit eCCE 0; in other words, the first ePDCCH is precoded by using the same precoding vector or matrix between multiple PRBs occupied by eCCE 0. Alternatively, if any first part of resources and second part of resources of the third resources cannot be used to transmit another two first ePDCCHs by using a same antenna port, for example, using eCCEs 4 and 5 of aggregation level 2 in FIG. 12(a) as an example, the third candidate resources may have two parts that are separately used as other third candidate resources, that is, eCCE 4 as one part, and eCCE 5 as the other part, which are used as third candidate resources of aggregation level 1, but the third candidate resources of the two parts cannot be simultaneously transmitted by using a same antenna port because PRBs occupied by them are overlapped, then, in the at least two PRBs included in the above third candidate resources, such as PRBs 8 to 11, the first ePDCCH may be precoded by using a same precoding vector or precoding matrix, for the same antenna port, such as antenna port 7 used for the first ePDCCH transmitted on the third candidate resources of aggregation level 2; in other words, the first ePDCCH is precoded by using the same precoding vector or matrix between multiple PRBs occupied by eCCEs 4 and 5. However, for the third candidate resources of aggregation level 4 in FIG. 12(a), such as eCCEs 4, 5, 6, and 7, assuming that one part of the resources includes eCCEs 4 and 5 of aggregation level 2, and the other part includes eCCEs 6 and 7 of aggregation level 2, the third candidate resources of the two parts may simultaneously transmit the first ePDCCH by using a same antenna port because the PRBs of the two parts are not overlapped. Therefore, generally, the first ePDCCH transmitted on the third candidate resources of aggregation level 4 cannot be precoded by using a same precoding vector or matrix between the occupied eight PRBs, but the two parts of the third candidate resources of aggregation level 4 can perform precoding separately by using a same precoding vector or matrix. Similarly, eCCEs 4 and eCCE 5 of aggregation level 2 in FIG. 12(b) cannot use a same precoding vector or matrix between PRBs 8 to 11, but can use a same precoding vector or matrix only for PRBs 8 and 9 or for PRBs 10 and 11 to implement precoding.

In addition, it can also be seen that the third candidate resource may occupy resources on multiple PRBs. Therefore, the mapping manner of the centralized first ePDCCH may also be used by the distributed first ePDCCH, that is, the mapping manners of the centralized first ePDCCH and the distributed first ePDCCH are the same because a diversity gain between multiple PRBs over a frequency can be obtained. However, antenna port modes are different. For example, the centralized ePDCCH generally uses one antenna port, and the port may correspond to an eCCE, while the distributed ePDCCH generally uses two ports, and the two ports are alternately used in a granularity of REs or REGs to achieve an effect of an antenna domain diversity. Then, for the first ePDCCH that transmits two antenna port determination manners in the same resource mapping manner, the network device needs to indicate the antenna port mode to the UE, where the antenna port mode is an antenna port mode for the centralized or distributed resource mapping manner in an existing system. Specifically, radio resource control signaling, or Layer 1/2 signaling such as physical layer signaling or media access layer signaling, may be used.

In the technical solutions provided in this embodiment, a first radio frame on a first carrier includes a first subframe where a control region is set, and a network device can send a PDCCH to a user equipment through the first subframe of the first radio frame. Therefore, when an ePDCCH cannot be sent in the first radio frame, the PDCCH can still be sent to the user equipment through the control region in the first subframe, thereby achieving purposes of performing uplink/downlink scheduling for the user equipment and downlink feedback for uplink data of the user equipment.

For example, the first subframe is one or more types of the following subframes: a multimedia broadcast multicast service single frequency network (MBSFN for short) subframe, a subframe bearing a channel state information reference signal (CSI-RS for short), special subframes in TDD special subframe configurations 0 and 5, and a physical multicast channel (PMCH for short) subframe. Alternatively, if a broadcast message is not configured with an MBSFN subframe, the network device does not configure the first subframe, that is, the network device only sends the second ePDCCH; and if a broadcast message is configured with an MBSFN subframe, the network device can configure the first subframe and send the PDCCH or the first ePDCCH.

Using the MBSFN subframe as an example, if a radio frame of a carrier is configured with an MBSFN subframe, where a multimedia broadcast multicast service (MBMS for short) is transmitted in the subframe, and the MBMS service occupies all carrier bandwidths in the MBSFN subframe, a control region and a demodulation region can be set in other subframes in the radio frame except the MBSFN subframe, and the control information borne in the PDCCH, including UL_grant, is sent in the subframe set with the control region and the demodulation region, that is, the first subframe, to the user equipment, thereby implementing uplink scheduling and downlink scheduling for the user equipment.

Using a subframe bearing a CSI-RS as an example, the CSI-RS is used for channel state information measurement and is configured for the user equipment only after setup of an RRC connection is completed. The UE does not know the CSI-RS configuration on the current carrier during access to the LTE system. The control region is set in a subframe except the subframe bearing the CSI-RS, that is, the first subframe, the CSI-RS is sent in the subframe bearing the CSI-RS, and scheduling information of public control information that is originally borne on an ePDCCH in an ePDCCH public search space, such as scheduling information of system information blocks, paging, and random access response, is sent in the first subframe. Because the control region is not overlapped with the CSI-RS resource, an impact on CSI-RS measurement can be avoided. If the scheduling information of the public control information is borne in the ePDCCH sent through the ePDCCH public search space in the CSI-RS subframe, the following problem may occur: The base station sends the scheduling information of the public control information in the ePDCCH public search space in the CSI-RS subframe; for a user equipment that needs to receive the scheduling information of the public control information, it is assumed that the CSI-RS does not exist, while for a user equipment that does not need to receive the scheduling information of the public control information and a user equipment that needs to receive the CSI-RS in the ePDCCH public search space to implement channel measurement or interference measurement, there is no CSI-RS, which affects CSI-RS measurement considerably, for example, information that is not CSI-RS information is treated as CSI-RS information and used for measurement, causing a great error in a measurement result.

Using special subframes in TDD special subframe configurations 0 and 5 as an example, DwPTS in these special subframes has only three symbols and is not suitable for ePDCCH transmission, and these special subframes cannot bear the UL_grant and PHICH. A control region and a demodulation region can be set in other subframes in TDD special subframe configurations 0 and 5, so as to send the UL_grant and PHICH.

Optionally, before the control information is sent in the control region of the first subframe of the first radio frame, the method further includes: notifying, by the network device, the user equipment of a position of the control region, where the first subframe includes multiple control regions, and the multiple control regions are frequency-multiplexed. Specifically, one or more of the multiple control regions may be configured for the UE. If one control region is configured for the UE, the UE detects the control information, such as PDCCH, in the configured control region; if multiple control regions are configured for the UE, the UE detects the control information, such as PDCCH, in the configured multiple control regions. In this case, in order to ensure that the number of PDCCH blind detections does not increase, the current number of blind detections of the UE needs to be distributed to the configured multiple control regions. The specific method is distributing the number of blind detections according to a control channel format, or evenly distributing the number of blind detections of a same control channel format to the configured multiple control regions.

Optionally, in order to implement inter-cell interference coordination, the control information and/or the demodulation signal is sent over a part of bandwidths of the first carrier. If the PDCCH sent in the control region is interleaved and distributed to all the bandwidths, it is disadvantageous for inter-cell interference coordination. This is the same case for the PHICH and PCFICH. The control region may be located in a part of bandwidths of the carrier. For example, a carrier bandwidth is 20 MHz, a control region of cell 1 may be configured at a bandwidth of 10 MHz, and a control region of cell 2 may be configured at another bandwidth of 10 MHz, so as to implement inter-cell interference coordination. In addition, for a UE with a small bandwidth receiving capability, for example, a UE of machine type has only a bandwidth receiving capability of 3 MHz (certainly, another small bandwidth is not excluded), the control region may be configured at a certain 3 MHz on a new carrier, and multiple control regions of 3 MHz may also be configured to support more UEs of this type, so as to increase control channel capacity.

Optionally, the PDCCH in the control region of the first subframe is scrambled or interleaved according to a virtual cell identifier. If scrambling and interleaving are implemented according to a cell identifier, when cell identifiers of different cells are different, interference exists between PDCCHs of the cells. Therefore, the PDCCH in the control region may be scrambled and interleaved by using a virtual cell identifier. For cells with different cell identifiers, PDCCHs may be scrambled and interleaved by using a same virtual cell identifier, thereby implementing joint PDCCH receiving to improve performance.

Figure 3:
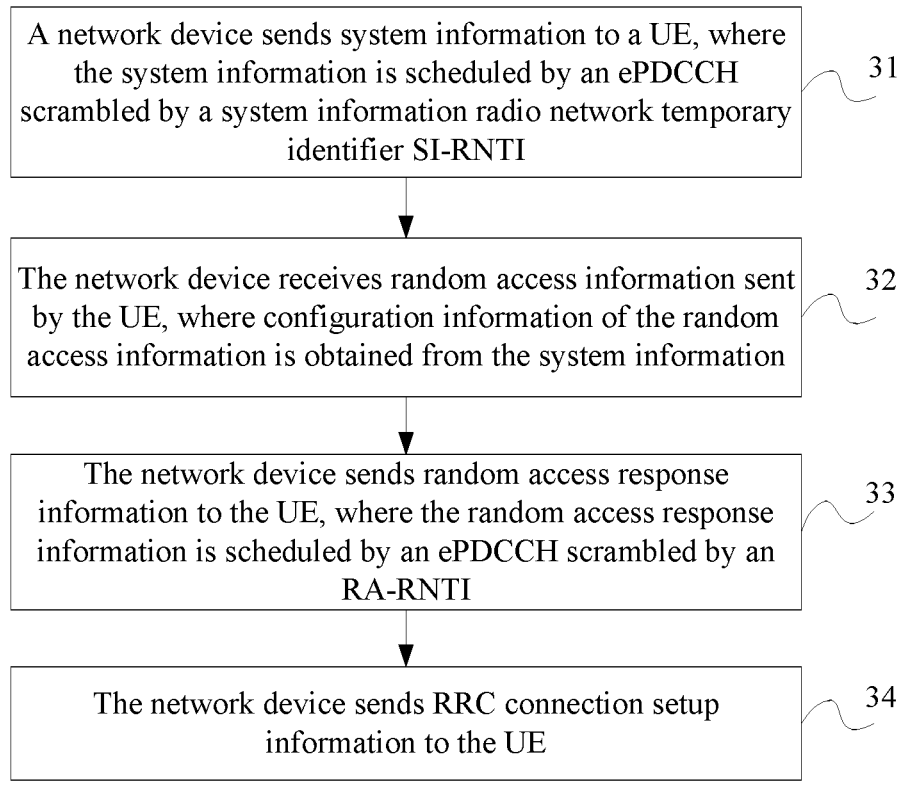
FIG. 3 is a flowchart of a random access method according to an embodiment of the present invention.

FIG. 3 is a flowchart of a random access method according to an embodiment of the present invention. Based on the above first carrier, this embodiment provides a random access method, including:

Step 31: A network device sends system information to a UE, where the system information is scheduled by an ePDCCH scrambled by a system information radio network temporary identifier SI-RNTI.

The network device schedules, through the ePDCCH scrambled by the system information radio network temporary identifier (SI-RNTI for short) and sent in an ePDCCH public search space, the system information sent to the user equipment. The user equipment detects a synchronization signal, so as to implement synchronization with the first carrier. After synchronization with the first carrier is implemented, the user equipment reads the system information through the ePDCCH scrambled by the SI-RNTI scrambled and sent in the ePDCCH public search space.

Step 32: The network device receives random access information sent by the user equipment, where configuration information of the random access information is obtained from the system information.

Step 33: The network device sends random access response information to the UE, where the random access response information is scheduled by an ePDCCH scrambled by an RA-RNTI.

The network device schedules, through the ePDCCH scrambled by the random access radio network temporary identifier (RA-RNTI for short) and sent in an ePDCCH public search space, the random access response information sent to the user equipment.

Step 34: The network device sends RRC connection setup information to the UE.

After the user equipment sets up an RRC connection with the network device through the RRC connection setup information sent by the network device, the user equipment can obtain a configuration of the first radio frame on the first carrier, thereby obtaining a configuration of the PDCCH in the first subframe.

In this embodiment, the user equipment first accesses the ePDCCH, and after the RRC connection is set up, obtains a position of the PDCCH, so as to obtain a configuration of the CSI-RS.

In this embodiment, a user equipment accesses a first carrier of an LTE system through an ePDCCH mechanism. An inter-cell interference coordination effect of an ePDCCH achieves better access performance in comparison with the previous PDCCH mechanism. After the UE accesses, a network device configures a first subframe for the UE, that is, a subframe bearing a control region, so that data scheduling and feedback can still be implemented on the first subframe in which the ePDCCH cannot be sent or is sent at a low efficiency.

Figure 4:
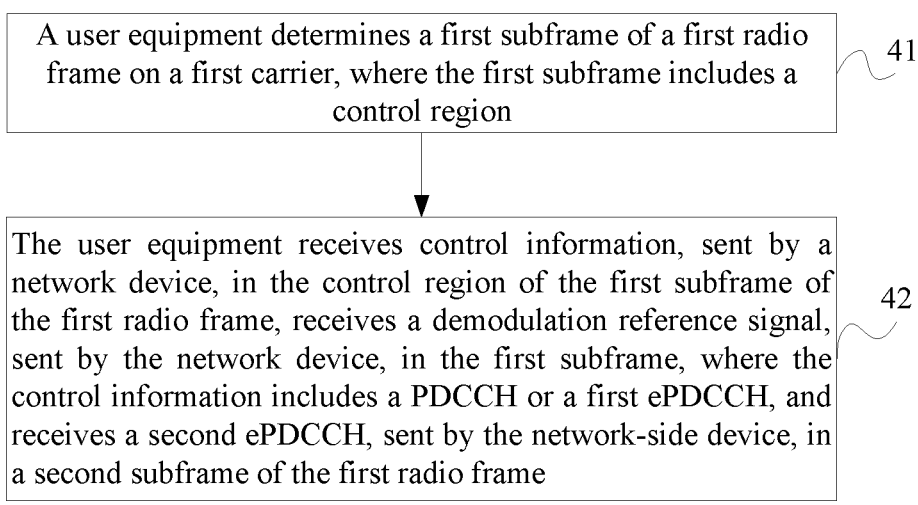
FIG. 4 is a flowchart of a control information receiving method according to an embodiment of the present invention.

FIG. 4 is a flowchart of a control information receiving method according to an embodiment of the present invention. As shown in FIG. 4, the method provided in this embodiment includes:

Step 41: A user equipment determines a first subframe in a first radio frame on a first carrier, where the first subframe includes a control region, the control region is in first n symbols of the first subframe, and n is a natural number less than 5.

Definitions of the first carrier and the first radio frame are the same as the definitions in the embodiment corresponding to FIG. 1, and details are not repeated herein.

Optionally, before the user equipment receives the control information in the control region in the first subframe of the first radio frame, the method further includes: obtaining, by the user equipment, a position of the control region, where the first subframe includes multiple control regions, and the multiple control regions are frequency-multiplexed. Specifically, one or more of the multiple control regions may be configured for the UE. If one control region is configured for the UE, the UE detects the control information, such as PDCCH, in the configured control region; if multiple control regions are configured for the UE, the UE detects the control information, such as PDCCH, in the configured multiple control regions. In this case, in order to ensure that the number of PDCCH blind detections does not increase, the current number of blind detections of the UE needs to be distributed to the configured multiple control regions. The specific method is distributing the number of blind detections according to a control channel format, or evenly distributing the number of blind detections of a same control channel format to the configured multiple control regions.

Step 42: The user equipment receives control information, sent by the network device, in the control region of the first subframe of the first radio frame, receives a demodulation reference signal, sent by the network device, in the first subframe, where the control information at least includes a PDCCH or a first enhanced physical downlink control channel ePDCCH, and receives the ePDCCH, sent by the network device, in a second subframe of the first radio frame.

The user equipment may receive the PDCCH in the first subframe of the first radio frame, and receives the ePDCCH, sent by the network device, in the second subframe of the first radio frame.

Further, the network device sends demodulation information in the first subframe to the user equipment only when the control information is sent. Alternatively, the demodulation reference signal is only used for control information demodulation, and is not used for operations such as synchronization or measurement. Specifically, the UE performs accurate synchronization and/or radio resource management measurement (including measurement on reference signal receiving power, reference signal receiving quality, and the like) by using a CRS that is periodically sent on the first carrier, for example, a CRS with a cycle of 5 ms (such as CRSs in subframe 0 and subframe 5). However, assuming that the foregoing demodulation reference signal in the first subframe can use a resource position of the CRS, the demodulation reference signal in the first subframe is only used for demodulation, for example, is only used for demodulation of the control information in the control region, and is not used for the accurate synchronization and/or radio resource management measurement.

Optionally, the control information further includes a PHICH and/or a PCFICH.

Optionally, the control information and/or the demodulation reference signal is sent in a part of bandwidths of the first carrier.

Optionally, a time-frequency position and/or a sequence of the demodulation reference signal is the same as that of a cell-specific reference signal CRS defined in an LTE system earlier than release 11; or optionally, an antenna port corresponding to the demodulation reference signal is all or a part of antenna ports 7 to 10 in the LTE system, where the antenna ports 7 to 10 are antenna ports corresponding to a user equipment-specific reference signal.

Optionally, the receiving a demodulation reference signal, sent by the network device, in the first subframe of the first radio frame specifically is: receiving, by the user equipment, the demodulation reference signal, sent by the network device, in the control region of the first subframe of the first radio frame.

Optionally, before step 41, the user equipment may receive RRC dedicated signaling sent by the network device. Through the RRC dedicated signaling, the user equipment can obtain a position of the first subframe of the first radio frame on the first carrier. Specifically, one obtaining manner is: obtaining from the network device which subframe of the first radio frame is the first subframe, where the first radio frame is any radio frame, a bitmap manner may be used as the specific obtaining manner. For example, if the first radio frame has 10 subframes, 10 bits are used to indicate the first subframes separately. This manner is also applicable when the number of subframes of the first radio frame differs. For example, if there are eight subframes, eight bits are used for indication. Another obtaining manner is: obtaining from a cycle of the first subframe and a position of the first subframe in the cycle that are indicated by the network device. For example, if the cycle is two radio frames, that is, 20 subframes, and positions of the first subframe in this cycle are subframes 0 and 1 of radio frame 0, the positions are subframes 0 and 1 of radio frames 2, 4, 6, and so on, in a next cycle. This manner is more flexible than the first manner, and better matching with PMCH subframes can be implemented because a PMCH has the largest demand for the first subframe.

Optionally, the PDCCH in the control region is scrambled or interleaved according to a virtual cell identifier. Correspondingly, the user equipment descrambles or de-interleaves the PDCCH in the control region by using the virtual cell identifier.

Optionally, before the user equipment receives the first ePDCCH, sent by the network device, in the control region of the first subframe of the first radio frame, the method according to this embodiment may further include:

determining a resource block RB group of the first ePDCCH in the control region, where the RB group corresponds to one RB pair, and the RB pair is a resource assignment unit of a physical downlink shared channel PDSCH in the LTE system; and determining a first candidate resource of the first ePDCCH in the RB group, where the first candidate resource includes a part of or all of resources of each RB of at least two RBs, and the at least two RBs belong to the RB group; where the receiving, by the user equipment, the first ePDCCH sent by the network device, in the control region of the first subframe of the first radio frame includes: receiving the first ePDCCH in the at least two RBs or in the RB group to which the first candidate resource belongs.

Optionally, an antenna port corresponding to the first ePDCCH is determined; and on the antenna port corresponding to the first ePDCCH, for the first ePDCCH and the demodulation reference signal that are corresponding to a same antenna port, it is assumed that a same precoding vector or precoding matrix is used to receive the first ePDCCH. Specifically, the antenna port corresponding to the first ePDCCH may be determined according to the first candidate resource. Specifically, the antenna port may be determined according to a resource position of the first candidate resource, for example, a position of a part of resources in one RB corresponds to antenna port 7, and a position of another part of resources corresponds to antenna port 8; the antenna port may also be determined according to a resource unit number or a resource position of the first ePDCCH, where the resource unit is at least one of an RB pair, an RB, an ECCE, an eREG, and an RE that form the first ePDCCH; and the antenna port may also be configured through RRC dedicated signaling, and specially, a port may be randomly selected, and then configured for the UE through the RRC signaling.

Optionally, the RB group corresponds to one RB pair, where the RB pair is a resource assignment unit of the second ePDCCH, and the RB pair is also a resource assignment unit of a PDSCH resource in the LTE. Specifically, the size of the resource in the RB group may be understood as comparable to the size of the resource in an RB pair, that is, their sizes are approximately equal. The RB group may also be called a PRB binding group because PRB binding can be implemented in this group to improve channel estimation performance.

Optionally, the RB group may correspond to an RB pair for resource assignment of the second ePDCCH in an extended cyclic prefix scenario. For example, four RBs may be included, where every two RBs correspond to one enhanced control channel element (eCCE), and one eCCE corresponds to one antenna port, that is, there are two antenna ports in total, such as ports 7 and 8.

Optionally, before the user equipment receives the first ePDCCH, sent by the network device, in the control region of the first subframe of the first radio frame, the method may further include:

determining a resource set of the first ePDCCH in the control region, where the resource set includes multiple resource block RB groups, each RB group of the multiple RB groups corresponds to one RB pair, and the RB pair is a resource assignment unit of a physical downlink shared channel PDSCH in the LTE system; and determining a second candidate resource of the first ePDCCH in the resource set, where the second candidate resource includes a part of or all of resources of each RB group of at least two RB groups, and the at least two RB groups are RB groups of the multiple RB groups; where the receiving, by the user equipment, the first ePDCCH sent by the network device, in the control region of the first subframe of the first radio frame includes: receiving the first ePDCCH in the at least two PRB binding groups included in the second candidate resource.

Optionally, an antenna port corresponding to the first ePDCCH is determined; and in each RB group included in the second candidate resource, for the first ePDCCH and the demodulation reference signal that are corresponding to the same antenna port, it is assumed that a same precoding vector or precoding matrix is used to receive the first ePDCCH. Specifically, the antenna port corresponding to the first ePDCCH may be determined according to the second candidate resource. Specifically, the antenna port may be determined according to a resource position of the second candidate resource, for example, a position of a part of resources in one RB corresponds to antenna port 7, and a position of another part of resources corresponds to antenna port 8; the antenna port may also be determined according to a resource unit number or a resource position of the first ePDCCH, where the resource unit is at least one of an RB pair, an RB, an ECCE, an eREG, and an RE that form the first ePDCCH; and the antenna port may also be configured through RRC dedicated signaling, and specially, a port may be randomly selected, and then configured for the UE through the RRC signaling.

Optionally, the RB group corresponds to one RB pair, where the RB pair is a resource assignment unit of the second ePDCCH, and the RB pair is also a resource assignment unit of a PDSCH resource in the LTE. Specifically, the size of the resource in the RB group may be understood as comparable to the size of the resource in an RB pair, that is, their sizes are approximately equal. The RB group may also be called a PRB binding group because PRB binding can be implemented in this group to improve channel estimation performance.

Optionally, the RB group may correspond to an RB pair for resource assignment of the second ePDCCH in an extended cyclic prefix scenario. For example, four RBs may be included, where every two RBs correspond to one enhanced control channel element (eCCE), and one eCCE corresponds to one antenna port, that is, there are two antenna ports in total, such as ports 7 and 8.

Optionally, before the user equipment receives the first ePDCCH, sent by the network device, in the control region of the first subframe of the first radio frame, the method may further include:

determining a third candidate resource bearing the first ePDCCH in the control region, where the third candidate resource includes resources in at least two resource block RBs; and determining an antenna port corresponding to the first ePDCCH borne on the third candidate resource. Specifically, the antenna port corresponding to the first ePDCCH may be determined according to the third candidate resource. Specifically, the antenna port may be determined according to a resource position of the third candidate resource, for example, a position of a part of resources in one RB corresponds to antenna port 7, and a position of another part of resources corresponds to antenna port 8; the antenna port may also be determined according to a resource unit number or a resource position of the first ePDCCH, where the resource unit is at least one of an RB pair, an RB, an ECCE, an eREG, and an RE that form the first ePDCCH; and the antenna port may also be configured through RRC dedicated signaling, and specially, a port may be randomly selected, and then configured for the UE through the RRC signaling.

The receiving, by the user equipment, the first ePDCCH sent by the network device, in the control region of the first subframe of the first radio frame includes: if any proper subset of the third candidate resource not capable of transmitting any complete ePDCCH, or if any two proper subsets of the third candidate resource are not capable of transmitting any two complete ePDCCHs separately by using a same antenna port, in the resources in the at least two RBs, for the first ePDCCH and the demodulation reference signal that are corresponding to a same antenna port, receiving the first ePDCCH by using a same precoding vector or precoding matrix.

Optionally, an antenna port mode is obtained from the network device, where the antenna port mode is a single-antenna-port mode in units of enhanced control channel element (eCCEs), or a two-antenna-port mode in units of resource element (REs). Specifically, the antenna port corresponding to the first ePDCCH is an antenna port used to transmit the first ePDCCH, so the antenna port corresponding to the first ePDCCH corresponding to the antenna port mode may be understood as an antenna port used to transmit the first ePDCCH and corresponding to the above single-antenna-port mode or dual antenna port mode.

For specific descriptions, refer to the embodiment of the method at the network side, and details are not repeated herein.

Optionally, before the UE receives the control information, sent by the network device, in the control region of the first subframe of the first radio frame, the network device notifies the UE of a position of the control region, where the first subframe includes multiple control regions, and the multiple control regions are frequency-multiplexed.

For example, the first subframe is one or more types of the following subframes: an MBSFN subframe, a subframe bearing a CSI-RS, special subframes in TDD special subframe configurations 0 and 5, and a physical multicast channel subframe. Alternatively, if a broadcast message is not configured with an MBSFN subframe, the UE receives only the second ePDCCH; and if a broadcast message is configured with an MBSFN subframe, the network device may obtain the first subframe and receive the PDCCH or the first ePDCCH in the first subframe.

Figure 5:
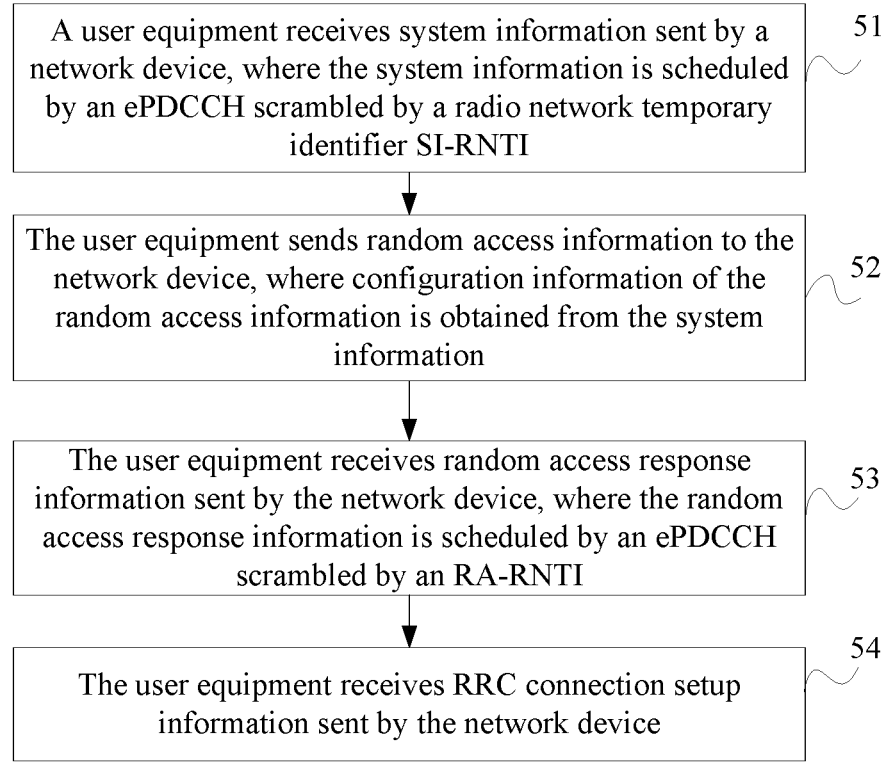
FIG. 5 is a flowchart of another random access method according to an embodiment of the present invention.

FIG. 5 is a flowchart of another random access method according to an embodiment of the present invention. As shown in FIG. 5, before RRC dedicated signaling sent by a network device is received, this embodiment further provides the following method.

Step 51: A user equipment receives system information sent by the network device, where the system information is scheduled by an ePDCCH scrambled by a system information radio network temporary identifier SI-RNTI.

Step 52: The user equipment sends random access information to the network device, where configuration information of the random access information is obtained from the system information.

Step 53: The user equipment receives random access response information sent by the network device, where the random access response information is scheduled by an ePDCCH scrambled by an RA-RNTI.

Step 54: The user equipment receives RRC connection setup information sent by the network device.

In this embodiment, a user equipment accesses a first carrier of an LTE system through an ePDCCH mechanism. An inter-cell interference coordination effect of an ePDCCH achieves better access performance in comparison with the previous PDCCH mechanism. After the UE accesses the LTE system through the ePDCCH mechanism, the UE can obtain a first subframe configuration of a network device, that is, a subframe bearing a control region, so that data scheduling and feedback can still be implemented on the first subframe in which the ePDCCH cannot be sent or is sent at a low efficiency.

Figure 6:
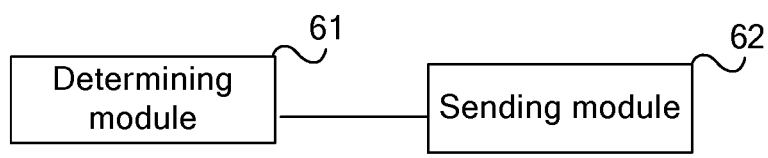
FIG. 6 is a schematic structural diagram of a control information sending apparatus according to an embodiment of the present invention.

FIG. 6 is a schematic structural diagram of a network device according to an embodiment of the present invention. As shown in FIG. 6, the network device provided in this embodiment includes: a determining module 61 and a sending module 62.

The determining module 61 is configured to determine a first subframe of a first radio frame on a first carrier, and transmit a position of the determined first subframe to the sending module 62, where the first subframe includes a control region, the control region is in first n symbols of the first subframe, and n is a natural number less than 5.

The sending module 62 is configured to send control information in the control region of the first subframe of the first radio frame to a user equipment, and send a demodulation reference signal in the first subframe of the first radio frame to the user equipment, where the control information at least includes a PDCCH or a first ePDCCH. Further, the control information may further include a PHICH and/or a PCFICH.

Optionally, in the sending a demodulation reference signal in the first subframe to the user equipment, the demodulation reference signal is sent only when the control information is sent; and/or, the demodulation reference signal is only used to demodulate the control information. Specifically, the UE performs accurate synchronization and/or radio resource management measurement (including measurement on reference signal receiving power, reference signal receiving quality, and the like) by using a CRS that is periodically sent on the first carrier, for example, a CRS with a cycle of 5 ms (such as CRSs in subframe 0 and subframe 5). However, assuming that the foregoing demodulation reference signal in the first subframe can use a resource position of the CRS, the demodulation reference signal in the first subframe is only used for demodulation, for example, is only used for demodulation of the control information in the control region, and is not used for the accurate synchronization and/or radio resource management measurement.

Optionally, a time-frequency position and/or a sequence of the demodulation reference signal is the same as that of a cell-specific reference signal CRS defined in an LTE system earlier than release 11.

Optionally, an antenna port corresponding to the demodulation reference signal is all or a part of antenna ports 7 to 10 in the LTE system, where the antenna ports 7 to 10 are antenna ports corresponding to a user equipment-specific reference signal.

Optionally, the control information and/or the demodulation reference signal is sent in a part of bandwidths of the first carrier.

Optionally, the sending module is further configured to: before sending the control information in the control region of the first subframe of the first radio frame to the user equipment, scramble or interleave the PDCCH in the control region by using a virtual cell identifier.

Optionally, the network device provided in this embodiment may further include a precoding module, where:

the determining module is further configured to: before the sending module sends the first ePDCCH, determine a resource block RB group of the first ePDCCH in the control region, where the RB group corresponds to one RB pair, and the RB pair is a resource assignment unit of a physical downlink shared channel PDSCH in the LTE system, and determine a first candidate resource of the first ePDCCH in the RB group, where the first candidate resource includes a part of or all of resources of each RB of at least two RBs, and the at least two RBs belong to the RB group;

the precoding module is configured to precode the first ePDCCH and the demodulation reference signal in the at least two RBs determined by the determining module or in the RB group to which the first candidate resource determined by the determining module belongs; and the sending module is specifically configured to send the first ePDCCH and the demodulation reference signal that are precoded by the precoding module to the user equipment.

Optionally, the precoding module is specifically configured to precode the first ePDCCH and the demodulation reference signal in the following manner: determining an antenna port corresponding to the first ePDCCH; and for the first ePDCCH and the demodulation reference signal that are corresponding to a same antenna port, precoding, by using a same precoding vector or precoding matrix, the first ePDCCH and the demodulation reference signal that are corresponding to the same antenna port. Specifically, the antenna port corresponding to the first ePDCCH may be determined according to the first candidate resource. Specifically, the antenna port may be determined according to a resource position of the first candidate resource, for example, a position of a part of resources in one RB corresponds to antenna port 7, and a position of another part of resources corresponds to antenna port 8; the antenna port may also be determined according to a resource unit number or a resource position of the first ePDCCH, where the resource unit is at least one of an RB pair, an RB, an ECCE, an eREG, and an RE that form the first ePDCCH; and the antenna port may also be configured through RRC dedicated signaling, and specially, a port may be randomly selected, and then configured for the UE through the RRC signaling.

Optionally, the RB group corresponds to one RB pair, where the RB pair is a resource assignment unit of the second ePDCCH, and the RB pair is also a resource assignment unit of a PDSCH resource in the LTE. Specifically, the size of the resource in the RB group may be understood as comparable to the size of the resource in an RB pair, that is, their sizes are approximately equal. The RB group may also be called a PRB binding group because PRB binding can be implemented in this group to improve channel estimation performance.

Optionally, the RB group may correspond to an RB pair for resource assignment of the second ePDCCH in an extended cyclic prefix scenario. For example, four RBs may be included, where every two RBs correspond to one enhanced control channel element (eCCE), and one eCCE corresponds to one antenna port, that is, there are two antenna ports in total, such as ports 7 and 8.

Optionally, the determining module is further configured to: before the sending module sends the first ePDCCH in the control region of the first subframe of the first radio frame to the user equipment, determine a resource set of the first ePDCCH in the control region, where the resource set includes multiple resource block RB groups, each RB group of the multiple RB groups corresponds to one RB pair, and the RB pair is a resource assignment unit of a physical downlink shared channel PDSCH in the LTE system; and determine a second candidate resource of the first ePDCCH in the resource set, where the second candidate resource includes a part of or all of resources of each RB group of at least two RB groups, and the at least two RB groups are RB groups of the multiple RB groups;

the precoding module is configured to precode the demodulation reference signal and the first ePDCCH, where the demodulation reference signal and the first ePDCCH are precoded and are borne in the at least two RB groups included in the second candidate resource determined by the determining module; and the sending module is specifically configured to send the first ePDCCH and the demodulation reference signal that are precoded by the precoding module to the user equipment.

Optionally, the precoding module is specifically configured to precode the first ePDCCH and the demodulation reference signal in the following manner: determining an antenna port corresponding to the first ePDCCH; and in each RB group included in the second candidate resource, for the first ePDCCH and the demodulation reference signal that are corresponding to a same antenna port, precoding, by using a same precoding vector or precoding matrix, the first ePDCCH and the demodulation reference signal that are corresponding to the same antenna port. Specifically, the antenna port corresponding to the first ePDCCH may be determined according to the second candidate resource. Specifically, the antenna port may be determined according to a resource position of the second candidate resource, for example, a position of a part of resources in one RB corresponds to antenna port 7, and a position of another part of resources corresponds to antenna port 8; the antenna port may also be determined according to a resource unit number or a resource position of the first ePDCCH, where the resource unit is at least one of an RB pair, an RB, an ECCE, an eREG, and an RE that form the first ePDCCH; and the antenna port may also be configured through RRC dedicated signaling, and specially, a port may be randomly selected, and then configured for the UE through the RRC signaling.

Optionally, the RB group corresponds to one RB pair, where the RB pair is a resource assignment unit of the second ePDCCH, and the RB pair is also a resource assignment unit of a PDSCH resource in the LTE. Specifically, the size of the resource in the RB group may be understood as comparable to the size of the resource in an RB pair, that is, their sizes are approximately equal. The RB group may also be called a PRB binding group because PRB binding can be implemented in this group to improve channel estimation performance.

Optionally, the RB group may correspond to an RB pair for resource assignment of the second ePDCCH in an extended cyclic prefix scenario. For example, four RBs may be included, where every two RBs correspond to one enhanced control channel element (eCCE), and one eCCE corresponds to one antenna port, that is, there are two antenna ports in total, such as ports 7 and 8.

Optionally, the determining module is further configured to: before the sending module sends the first ePDCCH in the control region of the first subframe of the first radio frame to the user equipment, determine a third candidate resource bearing the first ePDCCH in the control region, where the third candidate resource includes resources in at least two resource block RBs; and determine an antenna port corresponding to the first ePDCCH borne on the third candidate resource. Specifically, the antenna port corresponding to the first ePDCCH may be determined according to the third candidate resource. Specifically, the antenna port may be determined according to a resource position of the third candidate resource, for example, a position of a part of resources in one RB corresponds to antenna port 7, and a position of another part of resources corresponds to antenna port 8; the antenna port may also be determined according to a resource unit number or a resource position of the first ePDCCH, where the resource unit is at least one of an RB pair, an RB, an ECCE, an eREG, and an RE that form the first ePDCCH; and the antenna port may also be configured through RRC dedicated signaling, and specially, a port may be randomly selected, and then configured for the UE through the RRC signaling.

The precoding module is configured to: if any proper subset of the third candidate resource not capable of transmitting any complete ePDCCH, or if any two proper subsets of the third candidate resource are not capable of transmitting any two complete ePDCCHs separately by using a same antenna port, in the resources in the at least two RBs, for the first ePDCCH and the demodulation reference signal that are corresponding to a same antenna port, precode, by using a same precoding vector or precoding matrix, the first ePDCCH and the demodulation reference signal that are corresponding to the same antenna port; and the sending module is specifically configured to send the first ePDCCH and the demodulation reference signal that are precoded by the precoding module to the user equipment.

Optionally, the sending module is further configured to: before sending the control information to the user equipment, indicate an antenna port mode to the user equipment, where the antenna port mode is a single-antenna-port mode in units of enhanced control channel element (eCCEs), or a two-antenna-port mode in units of resource element (REs). Specifically, the antenna port corresponding to the first ePDCCH is an antenna port used to transmit the first ePDCCH, so the antenna port corresponding to the first ePDCCH corresponding to the antenna port mode may be understood as an antenna port used to transmit the first ePDCCH and corresponding to the above single-antenna-port mode or dual antenna port mode.

Optionally, the sending module 62 is further configured to send a second ePDCCH in a second subframe of the first radio frame to the user equipment.

Optionally, the sending module 62 is further configured to send RRC dedicated signaling to the user equipment, so as to indicate a position of the first subframe of the first radio frame on the first carrier to the user equipment. Specifically, one indication manner is: when the network device indicates which subframe of the first radio frame is the first subframe, where the first radio frame is any radio frame, a bitmap manner may be used as the specific indication manner. For example, if the first radio frame has 10 subframes, 10 bits are used to indicate the first subframes separately. This manner is also applicable when the number of subframes of the first radio frame differs. For example, if there are eight subframes, eight bits are used for indication. Another indication manner is: the network device may indicate a cycle of the first subframe and a position of the first subframe in the cycle. For example, if the cycle is two radio frames, that is, 20 subframes, and positions of the first subframe in this cycle are subframes 0 and 1 of radio frame 0, the positions are subframes 0 and 1 of radio frames 2, 4, 6, and so on, in a next cycle. This manner is more flexible than the first manner, and better matching with PMCH subframes can be implemented because a PMCH has the largest demand for the first subframe.

Optionally, the sending module 62 is further configured to send the demodulation reference signal in the control region in the first subframe of the first radio frame to the user equipment.

Optionally, the sending module 62 is further configured to: before sending the control information in the control region of the first subframe of the first radio frame to the user equipment, notify the user equipment of a position of the control region, where the first subframe includes multiple control regions, and the multiple control regions are frequency-multiplexed.

For example, the first subframe is one or more types of the following subframes: an MBSFN subframe, a subframe bearing a CSI-RS, special subframes in TDD special subframe configurations 0 and 5, and a physical multicast channel subframe. Alternatively, if a broadcast message is not configured with an MBSFN subframe, the network device does not configure the first subframe, that is, the network device only sends the second ePDCCH; and if a broadcast message is configured with an MBSFN subframe, the network device can configure the first subframe and send the PDCCH or the first ePDCCH.

The functions of the above modules are described in the embodiment corresponding to FIG. 1, and details are not repeated herein.

Figure 7:
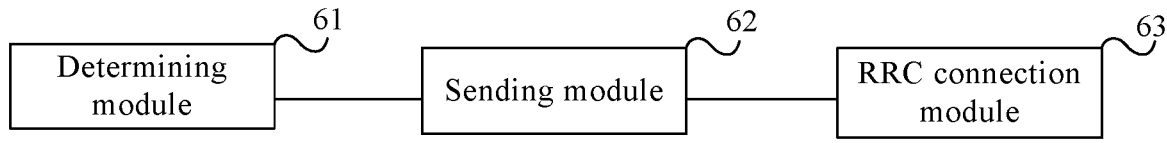
FIG. 7 is a schematic structural diagram of another control information sending apparatus according to an embodiment of the present invention.

As shown in FIG. 7, the network device provided in this embodiment may further include an RRC connection module 63.

The RRC connection module 63 is configured to: before the sending module 62 sends the RRC dedicated signaling to the user equipment, send system information to the user equipment, where the system information is scheduled by an ePDCCH scrambled by a system information radio network temporary identifier SI-RNTI; receive random access information sent by the user equipment, where configuration information of the random access information is obtained from the system information; send random access response information to the user equipment, where the random access response information is scheduled by an ePDCCH scrambled by an RA-RNTI; and send RRC connection setup information to the user equipment.

The functions of the above modules are described in the embodiment corresponding to FIG. 3, and details are not repeated herein.

Figure 8:
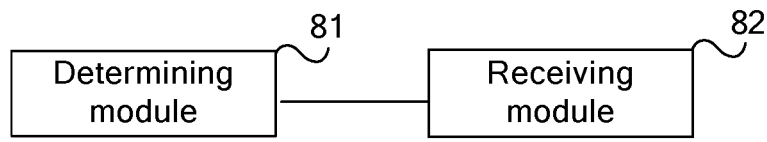
FIG. 8 is a schematic structural diagram of a control information receiving apparatus according to an embodiment of the present invention.

FIG. 8 is a schematic structural diagram of a control information receiving apparatus according to an embodiment of the present invention. As shown in FIG. 8, the apparatus provided in this embodiment includes: a determining module 81 and a receiving module 82.

The determining module 81 is configured to determine at least one first subframe of a first radio frame on a first carrier, where the first subframe includes a control region, the control region is in first n symbols of the first subframe, and n is a natural number less than 5.

The receiving module 82 is configured to receive control information, sent by a network device, in the control region of the first subframe of the first radio frame that is determined by the determining module 81, and receive a demodulation reference signal, sent by the network device, in the first subframe, where the control information includes a PDCCH or a first ePDCCH. Further, the control information may further include a PHICH and/or a PCFICH.

Optionally, in the receiving a demodulation reference signal, sent by the network device, in the first subframe, the demodulation reference signal is sent only when the control information is sent; and/or, the demodulation reference signal is only used to demodulate the control information. Specifically, the UE performs accurate synchronization and/or radio resource management measurement (including measurement on reference signal receiving power, reference signal receiving quality, and the like) by using a CRS that is periodically sent on the first carrier, for example, a CRS with a cycle of 5 ms (such as CRSs in subframe 0 and subframe 5). However, assuming that the foregoing demodulation reference signal in the first subframe can use a resource position of the CRS, the demodulation reference signal in the first subframe is only used for demodulation, for example, is only used for demodulation of the control information in the control region, and is not used for the accurate synchronization and/or radio resource management measurement.

Optionally, a time-frequency position and/or a sequence of the demodulation reference signal is the same as that of a cell-specific reference signal CRS defined in an LTE system earlier than release 11.

Optionally, an antenna port corresponding to the demodulation reference signal is all or a part of antenna ports 7 to 10 in the LTE system, where the antenna ports 7 to 10 are antenna ports corresponding to a user equipment-specific reference signal.

Optionally, the control information and/or the demodulation reference signal is sent in a part of bandwidths of the first carrier.

Optionally, the receiving module 82 is further configured to: before receiving the control information, sent by the network device, in the control region of the first subframe of the first radio frame, scramble or interleave the PDCCH in the control region by using a virtual cell identifier.

The receiving module 82 is further configured to receive a second ePDCCH, sent by the network device, in a second subframe of the first radio frame. The second subframe may be a subframe except the first subframe in the radio frame.

Optionally, the receiving module 82 is further configured to: before receiving the control information, sent by the network device, in the control region of the first subframe of the first radio frame, receive a position of the control region that is notified by the network device, where the first subframe includes multiple control regions, and the multiple control regions are frequency-multiplexed.

The receiving module 82 is further configured to: before at least one first subframe is determined in at least one radio frame on the first carrier, receive RRC dedicated signaling sent by the network device, where the RRC dedicated signaling is used to indicate a position of the first subframe of the first radio frame on the first carrier. Specifically, one obtaining manner is: obtaining from the network device which subframe of the first radio frame is the first subframe, where the first radio frame is any radio frame, a bitmap manner may be used as the specific obtaining manner. For example, if the first radio frame has 10 subframes, 10 bits are used to indicate the first subframes separately. This manner is also applicable when the number of subframes of the first radio frame differs. For example, if there are eight subframes, eight bits are used for indication. Another obtaining manner is: obtaining from a cycle of the first subframe and a position of the first subframe in the cycle that are indicated by the network device. For example, if the cycle is two radio frames, that is, 20 subframes, and positions of the first subframe in this cycle are subframes 0 and 1 of radio frame 0, the positions are subframes 0 and 1 of radio frames 2, 4, 6, and so on, in a next cycle. This manner is more flexible than the first manner, and better matching with PMCH subframes can be implemented because a PMCH has the largest demand for the first subframe.

The receiving module 82 is further configured to receive the demodulation reference signal, sent by the network device, in the control region of the first subframe of the first radio frame.

For example, the first subframe is one or more types of the following subframes: an MBSFN subframe, a subframe bearing a CSI-RS, special subframes in TDD special subframe configurations 0 and 5, and a physical multicast channel subframe. Alternatively, if a broadcast message is not configured with an MBSFN subframe, the UE receives only the second ePDCCH; and if a broadcast message is configured with an MBSFN subframe, the network device may obtain the first subframe and receive the PDCCH or the first ePDCCH in the first subframe.

Optionally, the determining module is further configured to: before the receiving module receives the first ePDCCH in the control region of the first subframe of the first radio frame, determine a resource block RB group of the first ePDCCH in the control region, where the RB group corresponds to one RB pair, and the RB pair is a resource assignment unit of a physical downlink shared channel PDSCH in the LTE system; and determine a first candidate resource of the first ePDCCH in the RB group, where the first candidate resource includes a part of or all of resources of each RB of at least two RBs, and the at least two RBs belong to the RB group; and the receiving module is specifically configured to receive the first ePDCCH in the control region of the first subframe of the first radio frame in the following manner: receiving the first ePDCCH in the at least two RBs or in the RB group to which the first candidate resource belongs.

Optionally, the determining module is further configured to determine an antenna port corresponding to the first ePDCCH. Specifically, the antenna port corresponding to the first ePDCCH may be determined according to the first candidate resource. Specifically, the antenna port may be determined according to a resource position of the first candidate resource, for example, a position of a part of resources in one RB corresponds to antenna port 7, and a position of another part of resources corresponds to antenna port 8; the antenna port may also be determined according to a resource unit number or a resource position of the first ePDCCH, where the resource unit is at least one of an RB pair, an RB, an ECCE, an eREG, and an RE that form the first ePDCCH; and the antenna port may also be configured through RRC dedicated signaling, and specially, a port may be randomly selected, and then configured for the UE through the RRC signaling.

The receiving module is specifically configured to receive the first ePDCCH in the control region of the first subframe of the first radio frame in the following manner: on the antenna port corresponding to the first ePDCCH, for the first ePDCCH and the demodulation reference signal that are corresponding to a same antenna port, receiving the first ePDCCH by using a same precoding vector or precoding matrix.

Optionally, the RB group corresponds to one RB pair, where the RB pair is a resource assignment unit of the second ePDCCH, and the RB pair is also a resource assignment unit of a PDSCH resource in the LTE. Specifically, the size of the resource in the RB group may be understood as comparable to the size of the resource in an RB pair, that is, their sizes are approximately equal. The RB group may also be called a PRB binding group because PRB binding can be implemented in this group to improve channel estimation performance.

Optionally, the RB group may correspond to an RB pair for resource assignment of the second ePDCCH in an extended cyclic prefix scenario. For example, four RBs may be included, where every two RBs correspond to one enhanced control channel element (eCCE), and one eCCE corresponds to one antenna port, that is, there are two antenna ports in total, such as ports 7 and 8.

Optionally, the determining module is further configured to: before the receiving module receives the first ePDCCH in the control region of the first subframe of the first radio frame, determine a resource set of the first ePDCCH in the control region, where the resource set includes multiple resource block RB groups, each RB group of the multiple RB groups corresponds to one RB pair, and the RB pair is a resource assignment unit of a physical downlink shared channel PDSCH in the LTE system; and determine a second candidate resource of the first ePDCCH in the resource set, where the second candidate resource includes a part of or all of resources of each RB group of at least two RB groups, and the at least two RB groups are RB groups of the multiple RB groups; and the receiving module is specifically configured to receive the first ePDCCH in the control region of the first subframe of the first radio frame in the following manner: receiving the first ePDCCH in the at least two RB groups included in the second candidate resource.

Optionally, the determining module is further configured to determine an antenna port corresponding to the first ePDCCH. Specifically, the antenna port corresponding to the first ePDCCH may be determined according to the second candidate resource. Specifically, the antenna port may be determined according to a resource position of the second candidate resource, for example, a position of a part of resources in one RB corresponds to antenna port 7, and a position of another part of resources corresponds to antenna port 8; the antenna port may also be determined according to a resource unit number or a resource position of the first ePDCCH, where the resource unit is at least one of an RB pair, an RB, an ECCE, an eREG, and an RE that form the first ePDCCH; and the antenna port may also be configured through RRC dedicated signaling, and specially, a port may be randomly selected, and then configured for the UE through the RRC signaling.

The receiving module is specifically configured to receive the first ePDCCH in the control region of the first subframe of the first radio frame in the following manner: in each RB group included in the second candidate resource, for the first ePDCCH and the demodulation reference signal that are corresponding to a same antenna port, the first ePDCCH is received by using a same precoding vector or precoding matrix.

Optionally, the RB group corresponds to one RB pair, where the RB pair is a resource assignment unit of the second ePDCCH, and the RB pair is also a resource assignment unit of a PDSCH resource in the LTE. Specifically, the size of the resource in the RB group may be understood as comparable to the size of the resource in an RB pair, that is, their sizes are approximately equal. The RB group may also be called a PRB binding group because PRB binding can be implemented in this group to improve channel estimation performance.

Optionally, the RB group may correspond to an RB pair for resource assignment of the second ePDCCH in an extended cyclic prefix scenario. For example, four RBs may be included, where every two RBs correspond to one enhanced control channel element (eCCE), and one eCCE corresponds to one antenna port, that is, there are two antenna ports in total, such as ports 7 and 8.

Optionally, the determining module is further configured to: before the receiving module receives the first ePDCCH, sent by the network device, in the control region of the first subframe of the first radio frame, determine a third candidate resource bearing the first ePDCCH in the control region, where the third candidate resource includes resources in at least two resource block RBs; and determine an antenna port corresponding to the first ePDCCH borne on the third candidate resource. Specifically, the antenna port corresponding to the first ePDCCH may be determined according to the third candidate resource. Specifically, the antenna port may be determined according to a resource position of the third candidate resource, for example, a position of a part of resources in one RB corresponds to antenna port 7, and a position of another part of resources corresponds to antenna port 8; the antenna port may also be determined according to a resource unit number or a resource position of the first ePDCCH, where the resource unit is at least one of an RB pair, an RB, an ECCE, an eREG, and an RE that form the first ePDCCH; and the antenna port may also be configured through RRC dedicated signaling, and specially, a port may be randomly selected, and then configured for the UE through the RRC signaling.

The receiving module is specifically configured to receive the first ePDCCH in the control region of the first subframe of the first radio frame in the following manner: if any proper subset of the third candidate resource not capable of transmitting any complete ePDCCH, or if any two proper subsets of the third candidate resource are not capable of transmitting any two complete ePDCCHs separately by using a same antenna port, in the resources in the at least two RBs, for the first ePDCCH and the demodulation reference signal that are corresponding to a same antenna port, the first ePDCCH is received using a same precoding vector or precoding matrix.

Optionally, the determining module is further configured to obtain an antenna port mode from the network device, where the antenna port mode is a single-antenna-port mode in units of enhanced control channel element (eCCEs), or a two-antenna-port mode in units of resource element REs. Specifically, the antenna port corresponding to the first ePDCCH is an antenna port used to transmit the first ePDCCH, so the antenna port corresponding to the first ePDCCH corresponding to the antenna port mode may be understood as an antenna port used to transmit the first ePDCCH and corresponding to the above single-antenna-port mode or dual antenna port mode.

The functions of the above modules are described in the embodiment corresponding to FIG. 4, and details are not repeated herein.

Figure 9:
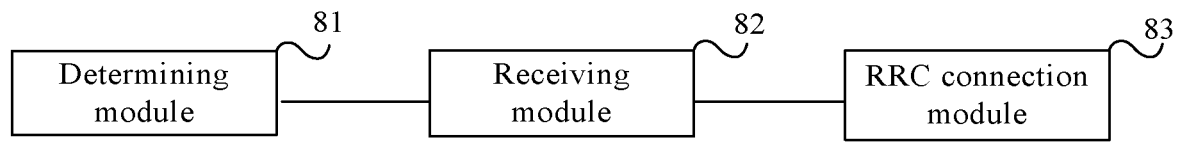
FIG. 9 is a schematic structural diagram of another control information receiving apparatus according to an embodiment of the present invention.

As shown in FIG. 9, an apparatus provided in this embodiment may further include an RRC connection module 83.

The RRC connection module 83 is configured to: before the RRC dedicated signaling sent by the network device is received, receive system information sent by the network device, where the system information is scheduled by an ePDCCH scrambled by a system information radio network temporary identifier (SI-RNTI); send random access information to the network device, where configuration information of the random access information is obtained from the system information; receive random access response information sent by the network device, where the random access response information is scheduled by an ePDCCH scrambled by an RA-RNTI; and receive RRC connection setup information sent by the network device.

The functions of the above modules are described in the embodiment corresponding to FIG. 5, and details are not repeated herein.

An embodiment of the present invention further provides a control information sending apparatus, including a processor, a sender, a memory, and a bus.

The processor, the sender, and the memory implement mutual communication through the bus.

The processor is configured to execute a computer program instruction.

The memory is configured to store the computer program instruction.

The computer program instruction is used to:

determine a first subframe of a first radio frame on a first carrier, where the first subframe includes a control region, the control region is in first n symbols of the first subframe, and n is a natural number less than 5;

through the sender, send control information in the control region of the first subframe of the first radio frame to a user equipment, and send a demodulation reference signal in the first subframe of the first radio frame to the user equipment, where the control information includes a PDCCH; and send an ePDCCH in a second subframe of the first radio frame to the user equipment through the sender, where the second subframe may be a subframe except the first subframe in the first radio frame.

Optionally, in the sending a demodulation reference signal in the first subframe to the user equipment, the demodulation reference signal is sent only when the control information is sent; and/or, the demodulation reference signal is only used to demodulate the control information.

The computer program instruction is further used to:

send RRC dedicated signaling to the user equipment through the sender, so as to indicate a position of the first subframe of the first radio frame on the first carrier to the user equipment.

The apparatus further includes a receiver.

The computer program instruction is further used to:

before the sender sends the RRC dedicated signaling to the user equipment, send system information to the user equipment through the sender, where the system information is scheduled by an ePDCCH scrambled by a system information radio network temporary identifier SI-RNTI; receive random access information sent by the user equipment, where configuration information of the random access information is obtained from the system information; send random access response information to the user equipment, where the random access response information is scheduled by an ePDCCH scrambled by an RA-RNTI; and send RRC connection setup information to the user equipment.

Optionally, the control information further includes a PHICH and/or a PCFICH.

Optionally, the control information and/or the demodulation reference signal is sent in a part of bandwidths of the first carrier.

Optionally, a time-frequency position and/or a sequence of the demodulation reference signal is the same as that of a cell-specific reference signal CRS defined in an LTE system earlier than release 11.

The computer program instruction is further used to:

send the demodulation reference signal in the control region of the first subframe of the first radio frame to the user equipment through the sender.

Optionally, before the control information is sent in the control region of the first subframe of the first radio frame to the user equipment, the PDCCH in the control region is scrambled or interleaved by using a virtual cell identifier.

Optionally, before the control information is sent in the control region of the first subframe of the first radio frame to the user equipment, the user equipment is notified of a position of the control region, where the first subframe includes multiple control regions, and the multiple control regions are frequency-multiplexed.

Optionally, the first subframe is one or more types of the following subframes: an MBSFN subframe, a subframe bearing a CSI-RS, special subframes in TDD special subframe configurations 0 and 5, and a physical multicast channel subframe.

An embodiment of the present invention further provides a user equipment, including a processor, a receiver, a memory, and a bus.

The processor, the receiver, and the memory implement mutual communication through the bus.

The processor is configured to execute a computer program instruction.

The memory is configured to store the computer program instruction.

The computer program instruction is used to:

determine a first subframe of a first radio frame on a first carrier, where the first subframe includes a control region, the control region is in first n symbols of the first subframe, and n is a natural number less than 5;

through the receiver, receive control information, sent by a network device, in the control region of the first subframe of the first radio frame, and receive a demodulation reference signal, sent by the network device, in the first subframe, where the control information includes a PDCCH; and receive an ePDCCH, sent by the network device, in a second subframe of the first radio frame through the receiver, where the second subframe may be a subframe except the first subframe in the radio frame.

Optionally, in the receiving a demodulation reference signal, sent by the network device, in the first subframe, the demodulation reference signal is sent only when the control information is sent; and/or, the demodulation reference signal is only used to demodulate the control information.

Optionally, before the first subframe of the first radio frame on the first carrier is received, RRC dedicated signaling sent by the network device is received through the receiver, where the RRC dedicated signaling is used to indicate a position of the first subframe of the first radio frame on the first carrier.

Optionally, before the RRC dedicated signaling sent by the network device is received, system information sent by the network device is received, where the system information is scheduled by an ePDCCH scrambled by a system information radio network temporary identifier SI-RNTI; random access information is sent to the network device, where configuration information of the random access information is obtained from the system information; random access response information sent by the network device is received, where the random access response information is scheduled by an ePDCCH scrambled by an RA-RNTI; and RRC connection setup information sent by the network device is received.

Optionally, the control information further includes a PHICH and/or a PCFICH.

Optionally, the control information and/or the demodulation reference signal is sent in a part of bandwidths of the first carrier.

Optionally, a time-frequency position and/or a sequence of the demodulation reference signal is the same as that of a cell-specific reference signal (CRS) defined in an LTE system earlier than release 11.

Optionally, the computer program instruction is further used to receive, through the sender, the demodulation reference signal, sent by the network device, in the control region of the first subframe of the first radio frame.

Optionally, the computer program instruction is further used to, before receiving the control information, sent by the network device, in the control region of the first subframe of the first radio frame, receive, through the receiver, a position of the control region that is notified by the network device, where the first subframe includes multiple control regions, and the multiple control regions are frequency-multiplexed.

Optionally, the computer program instruction is further used to, before receiving the control information, sent by the network device, in the control region of the first subframe of the first radio frame through the receiver, scramble or interleave the PDCCH in the control region by using a virtual cell identifier.

Optionally, the first subframe is one or more types of the following subframes: an MBSFN subframe, a subframe bearing a CSI-RS, special subframes in TDD special subframe configurations 0 and 5, and a physical multicast channel subframe.

Persons of ordinary skill in the art may understand that all or a part of the steps of the foregoing method embodiments may be implemented by a program instructing relevant hardware. The foregoing program may be stored in a computer readable storage medium. When the program runs, the steps of the foregoing method embodiments are performed. The foregoing storage mediums include various mediums capable of storing program code, such as a ROM, a RAM, a magnetic disk, or an optical disc.

Finally, it should be noted that, the foregoing embodiments are merely intended for describing the technical solutions of the present invention rather than limiting the present invention. Although the present invention is described in detail with reference to the foregoing embodiments, persons of ordinary skill in the art should understand that, they may still make modifications to the technical solutions described in the foregoing embodiments or make equivalent replacements to some technical features thereof, as long as these modifications or replacements do not cause the essence of corresponding technical solutions to depart from the scope of the technical solutions of the embodiments of the present invention.

What is claimed is:

1. A control information sending method comprising:
   determining a first downlink subframe of a first radio frame on a first carrier,
      wherein the first downlink subframe comprises at least two control regions and a data region, each of the at least two control regions is in first n symbols of the first downlink subframe, n is a natural number less than 5, and the number of symbols within the first downlink subframe is 12 or 14, and
      wherein the data region and the at least two control regions are time-multiplexed;
   notifying positions of the at least two control regions to a user device; and
   sending a control information and a demodulation reference signal in at least one of the at least two control regions to the user device.

2. The method according to claim 1, wherein the demodulation reference signal is sent only when the control information is sent and/or the demodulation reference signal is for demodulating the control information.

3. The method according to claim 1, wherein before determining the first downlink subframe of the radio frame on the first carrier, the method further comprises:
   sending a radio resource control (RRC) signaling indicating a resource position of the first downlink subframe on the first carrier to the user device.

4. The method according to claim 1, wherein the control information and/or the demodulation reference signal is sent on a part of bandwidth of the first carrier.

5. The method according to claim 1, wherein the control information comprises at least one physical downlink control channel (PDCCH).

6. A control information receiving method comprising:
   determining a first downlink subframe of a first radio frame on a first carrier,
      wherein the first downlink subframe comprises at least two control regions and a data region, each of the at least two control regions is in first n symbols of the first downlink subframe, n is a natural number less than 5, and the number of symbols within the first downlink subframe is 12 or 14, and
      wherein the data region and the at least two control regions are time-multiplexed;
   receiving positions of the at least two control regions from a network device; and
   receiving control information and a demodulation reference signal in at least one of the at least two control regions from the network device.

7. The method according to claim 6, wherein the demodulation reference signal is sent only when the control information is sent and/or the demodulation reference signal is for demodulating the control information.

8. The method according to claim 6, wherein before determining the first downlink subframe of the radio frame on the first carrier, the method further comprises:
   receiving a radio resource control (RRC) signaling indicating a resource position of the first downlink subframe on the first carrier from the network device.

9. The method according to claim 6, wherein the control information and/or the demodulation reference signal is sent on a part of bandwidth of the first carrier.

10. The method according to claim 6, wherein the control information comprises at least one physical downlink control channel (PDCCH).

11. An apparatus comprising:
    a processor configured to determine a first downlink subframe of a first radio frame on a first carrier,
       wherein the first downlink subframe comprises at least two control regions and a data region, each of the at least two control regions is in first n symbols of the first downlink subframe, n is a natural number less than 5, and the number of symbols within the first downlink subframe is 12 or 14, and
       wherein the data region and the at least two control regions are time-multiplexed; and
    a transmitter configured to cooperate with the processor to notify positions of the control regions to a user device; and to send control information and a demodulation reference signal in at least one of the at least two control regions to the user device.

12. The apparatus according to claim 11, wherein the demodulation reference signal is sent only when the control information is sent and/or the demodulation reference signal is for demodulating the control information.

13. The apparatus according to claim 11, wherein before the processor determining the first downlink subframe of the radio frame on the first carrier, the transmitter is further configured to cooperate with the processor to send a radio resource control (RRC) signaling indicating a position of the first downlink subframe on the first carrier to the user device.

14. The apparatus according to claim 11, wherein the control information and/or the demodulation reference signal is sent on a part of bandwidth of the first carrier.

15. The method according to claim 11, wherein the control information comprises at least one physical downlink control channel (PDCCH).

16. An apparatus comprising:
    a processor configured to determine a first downlink subframe of a first radio frame on a first carrier,
       wherein the first downlink subframe comprises at least two control regions and a data region, each of the at least two control regions is in first n symbols of the first downlink subframe, n is a natural number less than 5, and the number of symbols within the first downlink subframe is 12 or 14, and
       wherein the data region and the at least two control regions are time-multiplexed; and
    a receiver configured to cooperate with the processor to receive positions of the at least two control regions from the network device; and to receive control information and a demodulation reference signal in at least one of the at least two control regions from the network device.

17. The apparatus according to claim 16, wherein the demodulation reference signal is sent only when the control information is sent and/or, the demodulation reference signal received in the first downlink subframe by the transceiver is for demodulating the control information.

18. The apparatus according to claim 16, wherein before the processor determining the first downlink subframe of the radio frame on the first carrier, the receiver is further configured to cooperate with the processor to receive a radio resource control (RRC) signaling indicating a resource position of the first downlink subframe on the first carrier from the network device.

19. The apparatus according to claim 16, wherein the control information and/or the demodulation reference signal is sent on a part of bandwidth of the first carrier.

20. The method according to claim 16, wherein the control information comprises at least one physical downlink control channel (PDCCH).

21. A non-transitory computer readable medium, having stored thereon processor-executable instructions that when executed by a processor of a network device, causes the network device to execute operations comprising:

determining a first downlink subframe of a first radio frame on a first carrier,
wherein the first downlink subframe comprises at least two control regions and a data region, each of the at least two control regions is in first n symbols of the first downlink subframe, n is a natural number less than 5, and the number of symbols within the first downlink subframe is 12 or 14, and
wherein the data region and the at least two control regions are time-multiplexed;
notifying positions of the at least two control regions to a user device;
sending control information and a demodulation reference signal in at least one of the at least two control regions to the user device.

22. The non-transitory computer readable medium according to claim 21, wherein the demodulation reference signal is sent only when the control information is sent and/or the demodulation reference signal is for demodulating the control information.

23. The non-transitory computer readable medium according to claim 21, wherein before determining the first downlink subframe of the radio frame on the first carrier, the operations further comprise:
sending a radio resource control (RRC) signaling indicating a resource position of the first downlink subframe on the first carrier to the user device.

24. The non-transitory computer readable medium according to claim 21, wherein the control information and/or the demodulation reference signal is sent on a part of bandwidth of the first carrier.

25. The method according to claim 21, wherein the control information comprises at least one physical downlink control channel (PDCCH).

26. A non-transitory computer readable medium, having stored thereon processor-executable instructions that when executed by a processor of a user device, causes the user device to execute operations comprising:

determining a first downlink subframe of a first radio frame on a first carrier,
wherein the first downlink subframe comprises at least two control regions and a data region, each of the at least two control regions is in first n symbols of the first downlink subframe, n is a natural number less than 5, and the number of symbols within the first downlink subframe is 12 or 14, and
wherein the data region and the at least two control regions are time-multiplexed;
receiving positions of the at least two control regions from a network device; and
receiving a control information and a demodulation reference signal in at least one of the at least two control regions from the network device.

27. The non-transitory computer readable medium according to claim 26, wherein the demodulation reference signal is sent only when the control information is sent and/or the demodulation reference signal is for demodulating the control information.

28. The non-transitory computer readable medium according to claim 26, wherein before determining the first downlink subframe of the radio frame on the first carrier, the operations further comprise:
receiving, a radio resource control (RRC) signaling indicating a resource position of the first downlink subframe on the first carrier from the network device.

29. The non-transitory computer readable medium according to claim 26, wherein the control information and/or the demodulation reference signal is sent on a part of bandwidth of the first carrier.

30. The method according to claim 26, wherein the control information comprises at least one physical downlink control channel (PDCCH).

* * * * *